(12) United States Patent
Sade

(10) Patent No.: US 11,493,670 B2
(45) Date of Patent: Nov. 8, 2022

(54) LENS DESIGN WITH TOLERANCE OF FABRICATION ERRORS

(71) Applicant: iPhysicist Ltd., Natania (IL)

(72) Inventor: Sharon Sade, Kfar-Yona (IL)

(73) Assignee: iPhysicist Ltd., Natania (IL)

( * ) Notice: Subject to any disclaimer, the term of this patent is extended or adjusted under 35 U.S.C. 154(b) by 373 days.

(21) Appl. No.: 16/154,753

(22) Filed: Oct. 9, 2018

(65) Prior Publication Data

US 2019/0107651 A1 Apr. 11, 2019

Related U.S. Application Data

(60) Provisional application No. 62/569,650, filed on Oct. 9, 2017.

(51) Int. Cl.
| | |
|---|---|
| *G02B 3/00* | (2006.01) |
| *G06T 5/00* | (2006.01) |
| *G06T 5/50* | (2006.01) |
| *H04N 5/225* | (2006.01) |
| *G06T 7/11* | (2017.01) |

(52) U.S. Cl.
CPC ............ *G02B 3/0037* (2013.01); *G06T 5/002* (2013.01); *G06T 5/50* (2013.01); *G06T 7/11* (2017.01); *H04N 5/2254* (2013.01); *G06T 2207/20212* (2013.01)

(58) Field of Classification Search
CPC ......... G02B 3/08; G02B 5/1876; G02B 13/18
See application file for complete search history.

(56) References Cited

U.S. PATENT DOCUMENTS 5,982,543 A * 11/1999 Fiala .................... G02B 5/1895
351/159.01
6,313,908 B1 * 11/2001 McGill .................... G02B 5/32
356/28.5

(Continued)

FOREIGN PATENT DOCUMENTS

| CN | 1922549 | 2/2007 |
|---|---|---|
| CN | 101180635 | 5/2008 |

(Continued)

OTHER PUBLICATIONS

Notification of Office Action and Search Report dated Aug. 6, 2021 From the State Intellectual Property Office of the People's Republic of China Re. Application No. 201811171907.9 and Its Translation of Office Action Into English. (30 Pages).

(Continued)

*Primary Examiner* — Christopher Stanford

(57) ABSTRACT

An optical system that produces a digital image of a field of view, comprising:
a) a sensor array of light sensors that produces an output signal indicating an intensity of light received by each light sensor;
b) one or more optical elements that together project an image of the field of view onto the sensor array, including at least one sectioned optical element comprising a plurality of sections, at least two of the sections differing in one or both of size and shape, each section projecting onto the sensor array an image of only a portion of the field of view, the different sections projecting images of different portions of the field of view to non-overlapping regions of the sensor array.

36 Claims, 9 Drawing Sheets

(56) References Cited

U.S. PATENT DOCUMENTS

| | | | | |
|---|---|---|---|---|
| 6,717,747 | B2* | 4/2004 | Kaneko | G02B 3/08 |
| | | | | 359/718 |
| 8,385,000 | B2* | 2/2013 | Li | G02B 27/425 |
| | | | | 359/642 |
| 8,530,243 | B2 | 9/2013 | Ran et al. | |
| 8,995,058 | B2* | 3/2015 | Okada | G02B 13/18 |
| | | | | 359/574 |
| 9,772,465 | B2* | 9/2017 | Osborne | G02B 7/004 |
| 2007/0201148 | A1* | 8/2007 | Eckhardt | G02B 5/1876 |
| | | | | 359/742 |
| 2008/0292057 | A1 | 11/2008 | Finkler et al. | |
| 2009/0116127 | A1 | 5/2009 | Liang | |

FOREIGN PATENT DOCUMENTS

| | | |
|---|---|---|
| CN | 101441320 | 5/2009 |
| CN | 102177468 | 9/2011 |
| WO | WO 2005/083525 | 9/2005 |

OTHER PUBLICATIONS

Arecchi et al. "Lenslet Arrays", Field Guide to Illumination, Excerpt, Optipedia & SPIE Press, The International Society for Optics and Photonics, 1 P., 2007.

Bruckner et al. "Thin Wafer-Level Camera Lenses Inspired by Insect Compound Eyes", Optics Express, 18(24): 24379-24394, Published Online Nov. 8, 2010.

Medgadget "New Glasses Slow Down Myopic Progression in Children", Medgadget, 2 P., Apr. 19, 2018.

Wikipedia "Fresnel Lens", Wikipedia—The Free Encyclopedia, 9 P., Aug. 11, 2018.

Wikipedia "Image Stitching", Wikipedia—The Free Encyclopedia, 7 P., Aug. 12, 2018.

Wikipedia "Point Spread Function", Wikipedia—The Free Encyclopedia, 7 P., Oct. 2, 2018.

Wikipedia "Shack-Hartmann Wavefront Sensor", Wikipedia—The Free Encyclopedia, 2 P., Mar. 12, 2018.

Zemax "Zemax® 13: Optical Design Program", Zemax LLC, Radiant Zemax, User's Manual, p. 1-879, Aug. 19, 2014.

* cited by examiner

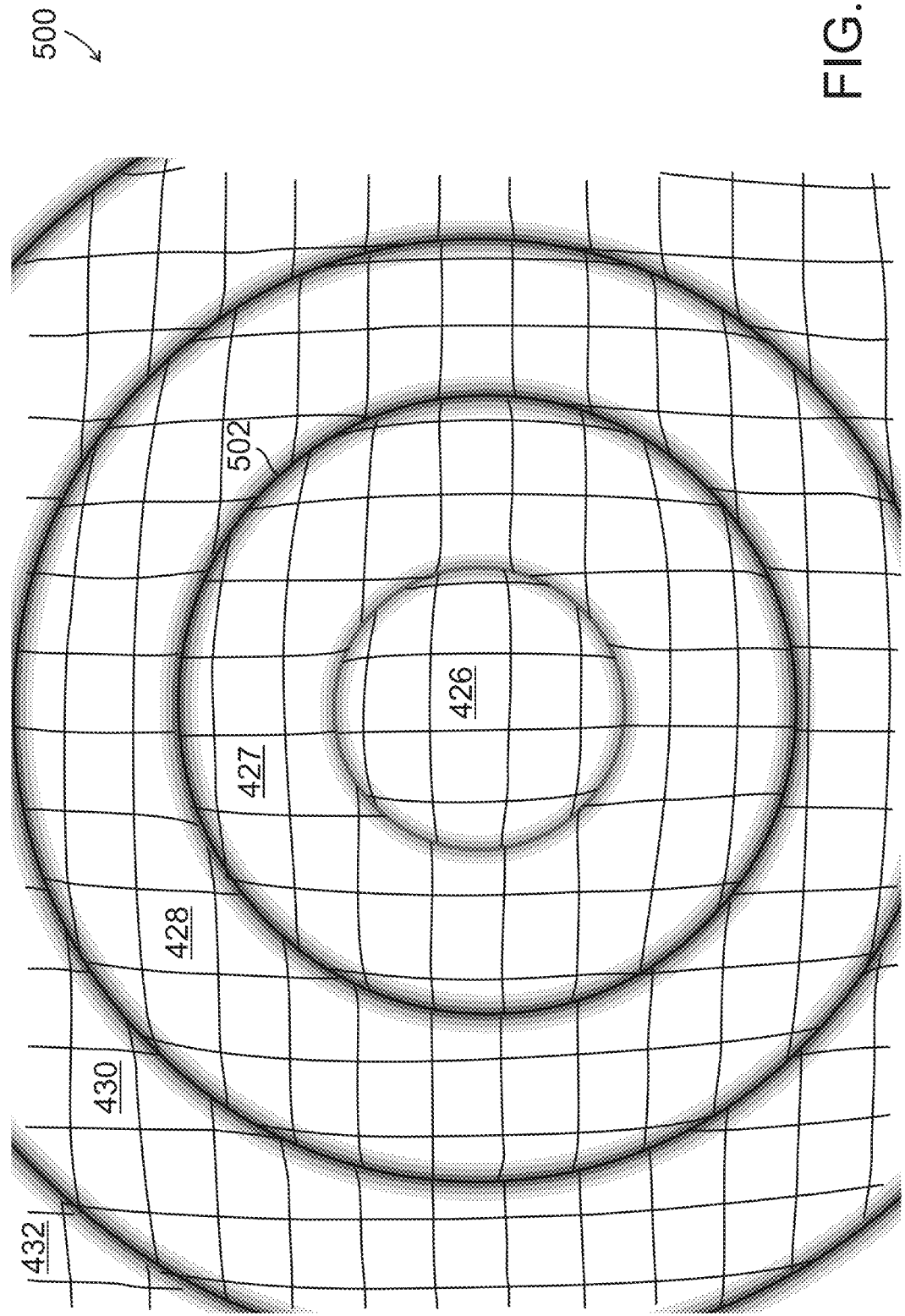

LENS DESIGN WITH TOLERANCE OF FABRICATION ERRORS

RELATED APPLICATIONS

This application claims the benefit of priority under 35 USC § 119(e) of U.S. Provisional Patent Application No. 62/569,650, filed on Oct. 9, 2017, the contents of which are incorporated by reference as if fully set forth herein in their entirety.

This application is also related to co-filed, co-pending and co-assigned Chinese Patent Application 09/140,970, entitled "LENS DESIGN WITH TOLERANCE OF FABRICATION ERRORS" the disclosure of which is incorporated herein by reference.

FIELD AND BACKGROUND OF THE INVENTION

The present invention, in some embodiments thereof, relates to designs of optical systems and, more particularly, but not exclusively, to lens designs for imaging systems and for projection systems, with improved manufacturing tolerances.

Cameras used in cell phones typically have very short distance from the first surface of the lens to the sensor, in order to fit into the thickness of the phone. In order to have high resolution, such cameras typically need to have sensor diagonal length comparable to or greater than that distance, to allow the sensor to have a large number of pixels, and to have wide aperture, in order to avoid limiting the resolution by diffraction effects. Both of these constraints typically result in a lens design with a large number of lens elements, for example 7 lens elements, and with high sensitivity of image quality to manufacturing errors, both for the shape and the position of the elements of the lens. Such high sensitivity to errors in shape and position of the components may result in a low manufacturing yield, since it may be difficult or impossible to manufacture the lens to tight enough tolerances. In addition, high sensitivity to errors in relative position of the lens elements may make it difficult to use a lens that folds out or telescopes out when in use, which could otherwise allow the distance from the surface of the lens to the sensor to be greater than the thickness of the phone. Such folding lens or telescoping lenses are often used in full-sized cameras which do not have such high sensitivity of image quality to manufacturing errors. The need for tight manufacturing tolerances, in order to keep errors in shape and position of the lens elements at an acceptable level, also increases the cost of manufacturing a cell phone camera of a given image quality.

Similar remarks apply to the lenses used in compact projection systems, such as heads-up displays that must fit into goggles.

Panoramic videos, such as IMAX movies, can extend over a very wide angle, even 360 degrees, by using multiple cameras pointing in different directions, such that the cameras collectively cover the desired total angular width of the video. The images from the different cameras may each be projected on a different surface or a different portion of a surface, in such a way that the different images appear to be seamlessly joined together.

Digital cameras often come with software that seamlessly joins together multiple photographs taken by panning the camera over a scene that covers a wider angle than the field of view of the camera.

Cameras may have more than one lens, simultaneously producing different images. For example, early color photography, before color film was available, sometimes used three lenses, each with a different color filter, which produced three images of the same scene that could be combined to form a color image. Similarly, stereo photographs were made by cameras with two lenses side by side.

Arrays of small lenses, sometimes called lenslets, are used for many purposes. A paper found at <http://spie(dot)org/publications/fg11_p68_lenslet_arrays?SSO=1>, downloaded on Feb. 22, 2018, describes using a lenslet array to achieve more uniform illumination. A Shack-Hartmann wavefront sensor, described by <https://en(dot)wikipedia(dot)org/wiki/Shack%E2%80%93Hartmann_wavefront_sensor>, downloaded on Feb. 22, 2018, is an optical instrument that uses an array of lenslets to characterize an imaging system. U.S. Pat. No. 8,530,243 to Ran et al describes an array of lenses used to produce multiple images for purposes of performing optical bio-assays, with each lens projecting light received from a different area of interest of the bio-assay. An article downloaded from <https://www(dot)medgadget(dot)com/2018/04/new-glasses-slow-down-myopic-progression-in-children (dot)html> on Apr. 29, 2018, describes "lenses for glasses that are able to slow down myopic progression in children. The center of the lens works as in a common pair of glasses, adjusting for myopia and astigmatism, while around this region the lens consists of dozens of spots of myopic defocus that help with vision correction."

As described by <https://en(dot)wikipedia(dot)org/wiki/Fresnel_lens>, downloaded on Feb. 22, 2018, a Fresnel lens reduces the amount of material required compared to a conventional lens by dividing the lens into a set of concentric annular sections. In each section, the overall thickness is decreased compared to an equivalent simple lens. This effectively divides the continuous surface of a standard lens into a set of surfaces of the same curvature as the standard lens, with stepwise discontinuities between them.

As described by <https://en(dot)wikipedia(dot)org/wiki/Point_spread_function>, downloaded on Feb. 22, 2018, in microscope image processing and astronomy, knowing the point spread function (PSF) of a measuring device is important for restoring the original image with deconvolution.

Additional background art includes U.S. Patent Application Publication No. 2009/0116127 to Liang.

SUMMARY OF THE INVENTION

An aspect of some embodiments of the invention concerns an imaging system with sectioned lens, each section of the lens producing a possibly distorted image of a different part of the field of view, for which software can smoothly join the different images together to form a single relatively undistorted image of the whole field of view.

There is thus provided, in accordance with an exemplary embodiment of the invention, an optical system that produces a digital image of a field of view, comprising:

a) a sensor array of light sensors that produces an output signal indicating an intensity of light received by each light sensor;

b) one or more optical elements that together project an image of the field of view onto the sensor array, including at least one sectioned optical element comprising a plurality of sections, at least two of the sections differing in one or both of size and shape, each section projecting onto the sensor array an image of only a portion of the field of view, the different sections projecting images of different portions of the field of view to non-overlapping regions of the sensor array.

Optionally, the sensor array is substantially planar.

Optionally, each portion of the field of view partially overlaps at least one of the other portions.

Optionally, most of the area of the sensor array receives light from parts of the field of view that belong to only one of the portions of the field of view.

In an exemplary embodiment of the invention, the optical system comprises a computer that receives the output signals of the sensor array, and that is configured to use the output signals to find digital images of the different portions of the field of view, and to use an image processing algorithm to combine the digital images of the different portions of the field of view into the digital image of the field of view.

Optionally, each portion of the field of view partially overlaps at least one of the other portions, and the image processing algorithm uses the overlapping parts of the portions to combine the digital images.

Optionally, the image processing algorithm is configured to combine the digital images of the different portions of the field of view so that overlapping parts of the portions appear only once in the digital image of the field of view.

Optionally, the image processing algorithm reduces or eliminates discontinuities in the digital image of the field of view between locations corresponding to different portions of the field of view.

Optionally, the image processing algorithm deconvolves an expected point spread function (PSF) from at least a portion of the digital images of the different portions of the field of view, before combining them, after combining them, or both.

Optionally, the expected PSF for at least one portion of the digital images or digital image which is deconvolved by the imaging system has at least 95% of its integral within a central region with no zeroes.

Optionally, for at least one portion of the digital images or digital image, the expected PSF is based at least on diffraction from an effective aperture, and the effective aperture includes a region with transmission greater than 10% of a maximum transmission in the effective aperture and less than 90% of the maximum transmission, wherein at least 20% of the area of the aperture with more than 10% of the maximum transmission has less than 90% of the maximum transmission, for at least some wavelengths of light between 400 and 1100 nm.

Optionally, the images of the different portions of the field of view have gaps between them that are not part of the digital image of any of the portions of the field of view.

Optionally, the at least one sectioned optical element has a surface with an orientation that is discontinuous at boundaries between the sections.

Optionally, the at least one sectioned optical element has one or more steps between the sections, and the orientation of a surface of that optical element in two adjacent sections on opposite sides of a step is discontinuous between the opposite sides of the step.

Optionally, the at least one sectioned optical element has an optical power that changes discontinuously at at least some boundaries between two of sections, for light rays reaching the two sections travelling in a same direction.

Optionally, the at least one sectioned optical element comprises gaps between at least some of the sections.

Optionally, each gap has a width less than 20% of a width, in a direction across the gap, of each of the sections that the gap is between.

Optionally, a greatest distance from the sensor array to any part of the one or more optical elements, is less than a greatest distance between any two parts of the sensor array on which parts of the image of the field of view is projected.

Optionally, the optical system comprises a mechanism for reversibly folding or collapsing the one or more optical elements relative to each other, relative to the sensor array, or both, to make the optical system more compact when it is not in use.

Optionally, at least a part of the images projected on the sensor array, corresponding to directions in the field of view less than 30 degrees from a central direction of the field of view, have a degree of distortion greater than 10%.

Optionally, no direction in the field of view is more than 10 degrees from a direction that is part of another portion of the field of view.

Optionally, no two of the portions of the field of view have a same shape and size in angular extent.

Optionally, at least two of the portions of the field of view comprise substantially concentric annuluses in angular extent.

In an exemplary embodiment of the invention, the sections of the sectioned optical element that project light from at least two portions of the field of view are substantially annular in shape, and substantially axisymmetric about a same optical axis.

Optionally, the two sections have front surfaces oriented on average inward toward the optical axis and back surfaces oriented on average outward away from the optical axis, with the front and back surface of a first one of the sections, that is located closer to the optical axis, oriented on average with a normal direction at a shallower angle to the optical axis than the front and back surfaces of a second one of the sections, that is located further from the optical axis.

Optionally, a first one of the sections, located closer to the optical axis, has an optical power, on average for light rays that it projects from the field of view to the sensor array, that is less positive than an average optical power of a second one of the sections, located further from the optical axis, for light rays that it projects from the field of view to the sensor array.

Optionally, the two sections comprise an inner section and an outer section, each with a front surface through which they receive light from the field of view, the front section of the inner section being entirely closer to the optical axis than any of the front surface of the outer section, wherein the front surface of the inner section has a greater radial extent than the front surface of the outer section.

Optionally, the two sections comprise an inner section and an outer section, each with a back surface through which they transmit light to the sensor array, the back section of the inner section being entirely closer to the optical axis than any of the back surface of the outer section, wherein the back surface of the inner section has a greater radial extent than the back surface of the outer section.

Optionally, the sections of the sectioned optical element comprise a plurality of lenslets arranged in concentric circles.

Optionally, the optical system comprises a front aperture that limits the light from the field of view that passes through and beyond a first optical element that light rays pass coming from the field of view, wherein at least 70% of the light that passes through the front aperture contributes to the image of the field of view on the sensor array.

Optionally, the area of the front aperture is connected.

Optionally, a boundary of the front aperture is in one plane, and the front aperture is its own convex hull in that plane.

In an exemplary embodiment of the invention, the optical system has an optical axis, a total track length along the optical axis from a furthest front surface of the optical elements to the sensor array that is less than 7 mm, and a field of view that extends at least 30 degrees in all directions around a central direction, wherein, if the optical system were manufactured with each optical element and each section of the one or more sectioned optical elements independently having a random error in position with a normal distribution with a two standard deviation value of 2 µm and no other manufacturing errors, then the manufacturing yield would be at least 50% for systems that satisfy a condition that a modulation transfer function is at least 50%, for at least resolution that is at least 80 cycles/mm, for 555 nm light, for all locations on the image that correspond to directions in the field of view within 30 degrees of the central direction, and is at least 70% for a location in the image that corresponds to the central direction in the field of view.

There is further provided, in accordance with an exemplary embodiment of the invention, a method of choosing a design for an optical system according to an embodiment of the invention, with decreased sensitivity of image quality to manufacturing errors for one or more of shape, relative orientation and relative position of the optical elements while still maintaining at least a minimum value of a measure of image quality that depends on a quality of the digital image over the field of view, the method comprising:

a) for each of a plurality of different designs for the optical system, all of which have at least the minimum value of the measure of image quality, calculating a figure of merit for the sensitivity of image quality to manufacturing errors, a higher figure of merit corresponding to a lower sensitivity of image quality to manufacturing errors; and b) choosing the design for which the figure of merit is highest.

There is further provided, in accordance with an exemplary embodiment of the invention, an optical system for projecting an original digital image to a real or virtual projected image for viewing, the system comprising:

a) a computer programmed to process the original digital image to produce a modified digital image comprising a plurality of non-overlapping regions, each region comprising a distorted mapping of a different region of the original digital image;

b) a display screen that displays the modified digital image; and c) a projection system comprising one or more optical elements that projects the display screen to the real or virtual projected image for viewing, including at least one sectioned optical element comprising a plurality of sections, at least two of the sections differing in one or both of size and shape, each section projecting a different one of the regions of the modified digital image to the real or virtual projected image;

wherein the computer is programmed to use an image processing algorithm to process the original digital image such that the distortions in the modified digital image substantially compensate for distortions to the modified digital image caused by the projection system, and the real or virtual projected image, when viewed, is a substantially undistorted image of the original digital image.

Optionally, at least some of the different regions of the original digital image overlap each other.

Optionally, a greatest distance from the display screen to any part of the one or more optical elements, is less than a greatest distance between any two parts of the display screen on which parts of the modified digital image are displayed.

Optionally, the optical system comprises a mechanism for reversibly folding or collapsing the one or more optical elements relative to each other, relative to the display screen, or both, to make the system more compact when it is not in use.

Optionally, at least a part of the modified digital image, corresponding to a part of the original digital image that is less than 30 degrees from a central location of the original digital image, has a degree of distortion greater than 10%.

Optionally, no direction in the projected image as viewed is more than 10 degrees from a direction that corresponds to a different one of the non-overlapping regions in the modified digital image.

Optionally, no two of the different regions of the original digital image have a same shape and size.

Optionally, at least two of the different regions of the original digital image comprise substantially concentric annuluses.

Optionally, for at least one portion of the display screen, the projection system has an effective aperture that includes a region with transmission greater than 10% of a maximum transmission of the effective aperture and less than 90% of the maximum transmission, wherein at least 20% of the area of the aperture with more than 10% of the maximum transmission has less than 90% of the maximum transmission, for at least some wavelengths of visible light emitted by that portion of the display screen.

There is further provided, according to an exemplary embodiment of the invention, a method of choosing a design for an optical system according to an embodiment of the invention, with reduced sensitivity of image quality of the viewed image to manufacturing errors in one or more of shape, relative orientation and relative position of the one or more optical elements of the projection system to each other and to the display screen while still maintaining at least a minimum value of a measure of image quality that depends on a quality of the viewed image, the method comprising:

a) for each of a plurality of different designs for the system, calculating a figure of merit for the sensitivity of image quality to manufacturing errors, a higher figure of merit corresponding to reduced sensitivity of image quality to manufacturing errors; and b) choosing the design for which the figure of merit is highest.

There is further provided, according to an exemplary embodiment of the invention, an optical configuration that projects an image of at least one field of view onto at least one focal surface for that field of view, the configuration comprising one or more optical elements that together project an image of the field of view onto the focal surface, including at least one optical element comprising a plurality of sections, at least two of the sections differing in one or both of size and shape, each section projecting onto the focal surface an image of only a portion of the field of view, the different sections projecting images of different portions of the field of view to non-overlapping regions of the focal surface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse or touch screen are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A and 5B are schematic drawings showing examples of the distorted image projected on the sensor, of a planar rectangular grid located far away and oriented normal to the longitudinal axis, for two different imaging systems similar to that shown in FIGS. 2 and 4, with greater distortion in the image shown in FIG. 5A than in the image shown in FIG. 5B;

DESCRIPTION OF SPECIFIC EMBODIMENTS OF THE INVENTION

Figure 1:
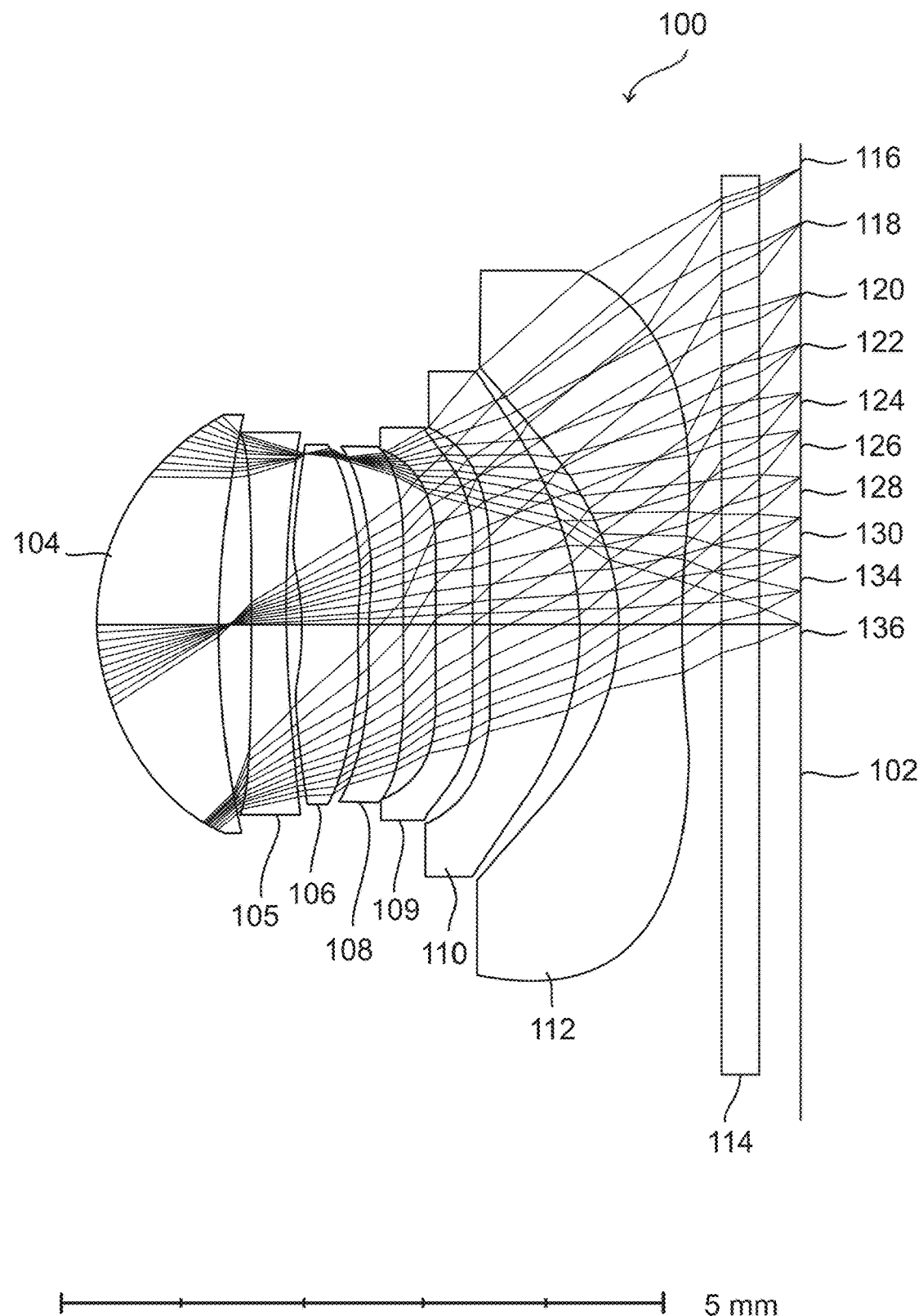
FIG. 1 is a schematic cross-sectional view of a cell phone camera lens, according to the prior art.

The present invention, in some embodiments thereof, relates to designs of optical systems and, more particularly, but not exclusively, to lens designs for imaging systems and for projection systems, with improved manufacturing tolerances.

Overview of Imaging System

An aspect of some embodiments of the invention concerns an imaging system in which optical elements, for example lenses, together project an image of a field of view onto an imaging sensor, for example a sensor comprising an array of light sensing elements, and at least one of the optical elements is divided into sections, each of which projects an image of only a portion of the field of view onto the sensor, with at least some of the sections differing in size and/or shape. The different images are projected to non-overlapping regions of the sensor, and may be distorted. Image processing software running on a computer or other digital processor optionally joins the different images into a corrected digital image of the whole field of view, for example an undistorted image with the different images smoothly joined together without discontinuities. Because each section of the sectioned optical element projects an image of only a portion of the field of view, and because distortions can be corrected by the software, the imaging system potentially has much better tolerance of fabrication errors, in shape and positioning of the optical elements, and/or potentially has much better image quality, than a conventional imaging system that fits within the same limited space, for example in a cell phone.

The imaging system need not include image processing software to join the different images into a corrected image of the field of view, and need not include a computer or digital processor to run such software, and a user of the imaging system may supply the image processing software and/or the computer or digital processor to run it. But it is potentially advantageous for users of the imaging system if it comes with such image processing software and/or with a computer or digital processor to run it.

As used herein, "field of view" means a range of directions from the front lens element, as well as a range of distances, which may in general depend on the direction. The range of distances may include infinity. Objects within the range of distances, for a direction within the field of view, will be imaged on the sensor surface, though, depending on their distance from the front lens, they will not necessarily be in perfect focus, and may not even be in very good focus. An object found outside the distance range for a direction within the field of view may be imaged so out of focus on the sensor surface that two light rays from that object, reaching a same location on the sensor surface, are projected through two different sections of the sectioned element. The condition that each section projects light to its own region of the sensor surface, which does not receive light projected through any other section, need not apply to light received from an object outside the distance limits of the field of view, even if it is within the range of directions of the field of view. If the optical elements are moved around to change the focus or zoom of the optical system, then in general the field of view may change, in range of directions and/or in range of distance for a given direction.

Optionally, the imaging is done with visible light, or with light in a wavelength range, such as near ultraviolet or near infrared, where imaging techniques are similar to those used for visible light, for example between 200 and 2500 nm, or even between 100 nm and 10,000 nm. As used herein, "light" may refer to light in a range of wavelengths where imaging techniques are similar to those used for visible light, and "imaging" may refer to imaging with such light.

Optionally, the different images projected to the sensor not only do not overlap, but they have gaps between them. Light sensing elements of the sensor located in those gaps may receive some light, projected by a section, or even by more than one section, from outside its portion of the field of view, but light received by those light sensing elements optionally is not used by the image processing software to produce the corrected digital image, and those pixels are optionally not considered part of any of the images of different portions of the field of view, projected to the sensor surface by different sections of the sectioned element.

Optionally the different portions of the field of view overlap, and optionally the overlapping parts are used by the image processing software to smoothly join the different images. When this happens, the corresponding two different sections may both receive light rays coming from the same direction in the field of view, but the light rays received by one section may enter the optical system through only part of the aperture, and the light rays received by the other section may enter the optical system through only a different part of the aperture Optionally, a large fraction of the light from the field of view that enters a front aperture of the imaging system reaches the sensor to form an image, for example at least 70%, or at least 75%, or at least 80%, or at least 85%, or at least 90%. The rest of the light is stopped, for example absorbed or reflected, somewhere between the front aperture and the sensor. Optionally, "front aperture" as used herein means the area through which light enters and passes through a first optical element, for example a front lens element, on its way from the field of view to the sensor to form an image, and the aperture can be identical to the first optical element, or it can comprise a baffle or mechanical stop, and/or a filter, immediately in front of or immediately behind the first optical element. Alternatively, if the boundaries of that area are all in one plane, the front aperture is defined as the "convex hull" of that area in that plane, with the convex hull of an area defined as the smallest region in the plane containing the area, for which a line segment joining any two points on the boundary of the region goes entirely through the region. Optionally, the front aperture, whether or not it is defined in that way as the convex hull of the area, includes some areas that transmit less than 100% but more than 0% of the light from the field of view that enters them, and optionally some of those areas transmit a lower percentage of the light from the field of view that enters them than other of those areas, for example the front aperture is at least approximately a Gaussian aperture. Optionally, a large fraction of the light that is transmitted through the front aperture reaches the sensor to form an image, for example at least 70%, or at least 75%, or at least 80%, or at least 85%, or at least 90%, even though a large fraction of the light from the field of view that reaches the front of the front aperture does not necessarily reach the sensor to form an image. Optionally, there is only a single front aperture, defined herein as a single connected area, not necessarily equal to its convex hull, through which any light from the field of view reaches the sensor to form an image. Optionally, this single front aperture is equal to its convex hull.

There may be a tendency, in imaging systems with a relatively large sensor width and height compared to the total track length, and relatively wide field of view, for the parts of the image corresponding to the more outer part of the field of view, and projected to the more outer parts of the sensor array, to have lower image quality, and/or greater sensitivity of image quality to fabrication errors, than the more inner parts of the field of view, projected to parts of the sensor array closer to the center. Optionally, to improve the image quality and/or the sensitivity of the image quality in the outer parts of the field of view, the sections of the sectioned element are annular in shape, surrounding a central axis, with the radial thickness of the annulus smaller for sections that are further out from the central axis, which project images of more outer portions of the field of view, than for sections that are closer to the axis, and project images of more inner portions of the field of view.

Optionally the different sections of the sectioned optical element have surface orientations that are discontinuous at the boundary between them. Optionally there are gaps between the different sections. If there is a gap at the boundary between two sections, then a "discontinuity in orientation of the surface at the boundary" means that the orientation changes more, in going from one section to the other, than would be expected across a gap of that size, given the curvature of the surface in each section near the boundary. Optionally, the discontinuity in surface orientation is like the discontinuity of a Fresnel lens, in which there is a step between different sections, but the orientation of the surface on each side of the step is the same. Alternatively, unlike a Fresnel lens, even if there is a step between sections, the orientation of the surface on each side of the step is different, optionally very different. Optionally, a surface of the sectioned optical element that is substantially parallel to light rays coming from the portion of the field of view that is projected by the sections adjacent to the surface is not considered a surface for purposes of the statement that there is a discontinuity in orientation of the surface at the boundary, but is only considered a step between sections. By this definition, a Fresnel lens, projecting an image of light rays coming from infinity and from directions at only a small angle to its axis, does not have discontinuities in orientation of its surface between sections.

Optionally, any gap between two sections is relatively narrow compared to the width of the sections in a direction across the gap, for example less than 20%, or less than 10%, of the width of the sections. Optionally, the gap between two sections is opaque, so it does not transmit light. Alternatively, the gap is transparent, and comprises air, or comprises a transparent material, for example the same transparent material that the sections are made of. If one or more of the gaps are transparent, then optionally they are small enough that any light they transmit to the sensor will have very low intensity compared to the light transmitted through the sections, and will not interfere very much with the quality of the image. If a gap is made of a transparent material, such as the same material that the sections are made of, then optionally the surface of the sectioned optical element is continuous across the gap, and has a continuous orientation across the gap. For example, instead of a sharp step or a sharp break between sections, the step or the break is slightly rounded and smoothed. This may make it easier to manufacture the sectioned element.

Optionally, there is a discontinuity in optical power, in going from one section of the sectioned element to an adjacent section, for light rays going in the same direction. This means, for example, that there is a sudden change in curvature of the surface, for the front surface or back surface or both, between one section and an adjacent section. If there is a narrow gap between the two adjacent sections, then optionally the optical power changes much more, in going from one section to the other, than in going the same distance within one of the sections. As used herein, this is considered a discontinuity in optical power between adjacent sections. Optionally, the optical power within a section is fairly uniform, compared to differences in optical power between sections, at least for some sections. Having a fairly uniform optical power within each section, and larger changes in optical power between sections, may reduce the sensitivity of the image quality to errors in position of the sectioned element, and may improve the image quality, as will be explained below in the description of FIG. 4.

Optionally, the optical elements together comprise a compact lens, in which the greatest distance from the first optical surface of the lens the sensor, called the total track length (TTL), is less than the greatest distance between any two parts of the sensor on which parts of the image of the field of view are projected, which is the diagonal size of the sensor in the case of a rectangular sensor all of which is being used for the image, or less than 0.5 or 0.7 or 0.85 or 1.2 or 1.5 or 2 times the greatest distance between any two parts of the sensor on which parts of the image of the field of view are projected. Optionally, the focal length of the lens is less than the greatest distance between any two parts of the sensor on which parts of the image of the field of view are projected, or less than 0.5 or 0.7 or 0.85 or 1.2 or 1.5 or 2 times the greatest distance between any two parts of the sensor on which parts of the image of the field of view are projected.

Optionally, the optical elements of the imaging system can be folded down or collapsed when the imaging system is not in use. Optionally, the tolerance to fabrication errors is good enough so that, when the optical elements are folded down or collapsed, and then restored to their proper positions when the imaging system is used, any resulting errors in relative position of the different optical elements, to each other or to the sensor, do not exceed the tolerances. In prior art cell phone cameras, this is generally not possible, because the tolerances are too tight, and as a result the TTL has to be smaller than the thickness of the cell phone, and the resolution and image quality are generally substantially worse than for larger cameras. With such a folding lens, a camera in a cell phone can potentially have optical quality and resolution comparable to those typical of good quality full-size cameras, for example good quality digital 35 mm cameras.

Optionally, no direction in the field of view is more than 5 degrees, or more than 10 degrees, or more than 20 degrees, or more than 30 degrees, or more than 45 degrees, from a direction that is part of a different one of the portions of the field of view. Optionally, no two of the portions of the field of view have a same shape and size, or at least two of the portions of the field of view have a different shape or a different size or both. Optionally, at least two of the portions of the field of view comprise substantially concentric annuluses, each annulus optionally having inner and outer boundaries that are substantially concentric circles, or all of the portions comprise substantially concentric annuluses, each annulus optionally having inner and outer boundaries that are substantially concentric circles. Here, "substantially concentric circles" means that each boundary follows a circular path within 20%, or 10%, or 5%, or 2%, or 1%, of the radius of the circular path, and that the centers of the circular paths for the inner and outer boundaries are closer together than 20%, or 10%, or 5%, or 2%, or 1%, of the radius of the circular path for the outer boundary, or for the inner boundary. Optionally, at least two of the sections, or all of the sections, have boundaries that are substantially cylindrically symmetric around a same axis of the optical elements that is oriented along the central direction of the field of view. Optionally, the sectioned optical element is substantially cylindrically symmetric around that axis. Optionally, the optical elements together are substantially cylindrically symmetric around that axis. Here, "substantially cylindrically symmetric" means following a cylindrically symmetric shape within 20% or 10% or 5% or 2% or 1% of the distance to the symmetry axis.

Alternatively, the sections of the sectioned optical element, and the corresponding portions of the field of view, are far from axisymmetric around an axis. For example, the sections comprise a plurality of lenslets that are not all identical, for example the lenslets are arranged in a series of concentric circles around an axis, or the lenslets are arranged in a spiral pattern around an axis, and lenslets that are closer to the axis have a different shape and/or a different size than lenslets that are further from the axis.

A potential advantage of an imaging system with a sectioned optical element is that it may be possible to design the system so that its image quality is significantly less sensitive to manufacturing errors in position, orientation and shape of the different optical elements and sections, than for a similar system which does not include a sectioned optical element. For example, consider a camera with a sectioned optical element, suitable for use in a cell phone, with total track length (TTL) of less than 4 mm, or less than 5 mm, or less than 6 mm, or less than 7 mm, or less than 8 mm, or less than 10 mm, and with a field of view that extends at least 25 degrees, or at least 30 degrees, or at least 32 degrees, or at least 35 degrees, or at least 40 degrees, or at least 50 degrees from a central direction, and manufactured to a specification that requires the image to have a modulation transfer function (MTF) that is at least 30%, or at least 40%, or at least 50%, or at least 60%, or at least 70%, at a single wavelength, for example 555 nm, or that has a weighted average value of MTF for a plurality of different wavelengths, for example 470 nm, 510 nm, 555 nm, 610 nm, and 670 nm, respectively with weights, for example, of 0.1, 0.5, 1.0, 0.5, and 0.1, for at least one value of resolution that is at least 40 cycles/mm, or at least 60 cycles/mm, or at least 80 cycles/mm, or at least 100 cycles/mm, or at least 120 cycles/mm, or at least 140 cycles/mm, or at least 160 cycles/mm, or at least 200 cycles/mm, or least 250 cycles/mm, at all locations on the image that correspond to directions within 25 degrees, or within 30 degrees, or within 32 degrees, or within 35 degrees, or within 40 degrees, or within 50 degrees of the central direction of the field of view. It should be noted that, in the usual situation where the MTF is a monotonically decreasing function of resolution, for a given wavelength at a given location in the image, requiring the MTF to be at least 50% for at least one value of resolution that is at least 80 cycles/mm is equivalent to requiring the MTF to be at least 50% at a resolution of 80 cycles/mm, and similarly for other values of MTF and resolution. Then optionally, if each optical element, and each section of the sectioned optical element, has a manufacturing error in position that varies with a normal distribution with a two standard deviations value of 1.5 µm, or 2.0 µm, or 3.0 µm, or 4.0 µm, with a random magnitude and direction independently of the other optical elements and sections, then the manufacturing yield of cameras that meet the specification will be at least 40%, or at least 50%, or at least 60%, or at least 70%, or at least 80% or at least 90%. To obtain similarly high manufacturing yields for cell phone cameras of similar specifications without a sectioned optical element, the errors in position of the optical elements typically have to be significantly smaller, for example two standard deviations values of 1.0 μm or less. Examples of two such camera designs, similar in dimensions, field of view, and resolution, one with a sectioned optical element and one without a sectioned optical element, are presented below in the "Examples" section. Both designs were optimized for insensitivity of image quality to manufacturing errors. For a reasonable set of manufacturing tolerances, the design with a sectioned optical element has a yield of 80%, while the design without a sectioned optical element has a yield of only 20%. To increase the yield of the latter design to 80%, it would have to be manufactured with tolerances only half as great.

Optionally, the image processing algorithm deconvolves an expected point spread function (PSF) from at least a portion of the digital images of the different portions of the field of view, before combining them, after combining them, or both. In general, the expected PSF may be different for different wavelengths, and may be deconvolved from an image separately for different wavelengths, or for different wavelength bands. Optionally, the expected point spread function is based at least in part on known characteristics of the optical elements, as opposed to factors that may not be known in advance, such as the distance to something that is located in the field of view. For example, the PSF may depend on diffraction effects from an effective aperture of the optical elements, and/or on aberration of the optical elements. In general, the PSF may be different for different directions in a given portion of the field of view. The presence of zeroes in a PSF may make deconvolution more difficult or less effective. Optionally, the optical system is designed so that the PSF has no zeroes in it, or has no zeroes within a central portion that includes most of the integrated value of the PSF, for at least some wavelengths of light. For example, the PSF has a central portion, with no zeroes, that includes at least 95% of the integral over the sensor of the absolute value squared of the PSF, or at least 98% of the integral, or at least 99% of the integral, for those wavelengths. Optionally, this PSF is due to diffraction from an aperture that cuts off transmission of light gradually, rather than having either 100% transmission or 0% transmission at all locations, or rather than the transmission having its maximum value or being 0% at all locations. For example, for at least some wavelengths of light, even at wavelengths for which the material of the lens elements has negligible absorption, for example for at least some wavelengths greater than 350 nm or 400 nm and less than 1100 nm or 1500 nm or 2000 nm, the transmission of light is less than 90% of its maximum value over a significant fraction of the area of the aperture where the transmission is greater than 10% or its maximum value, for example over at least 10% or at least 20% or at least 50% of the area. For example, the aperture is a good approximation to a Gaussian aperture, at least out to some distance before the transmission falls to zero, for example out to at least the full width at half maximum of the Gaussian, or out to at least twice that distance. A truly Gaussian aperture, if it were possible, would have a Gaussian PSF with no zeroes, due to diffraction, and a good approximation to a Gaussian aperture would have a PSF that is a good approximation to a Gaussian, with zeroes only far out on its tail.

An imaging system of this sort may be designed to have optimized or at least improved insensitivity to fabrication errors, for shape, orientation and position of the optical elements, while still maintaining a minimum overall image quality over the field of view, as defined by some measure of image quality. This may be done, for example, by defining a figure of merit for manufacturing tolerance, then searching through a parameter space of the design of the imaging system to find a design that maximizes the figure of merit, or has a higher figure of merit than other designs that were searched, subject to the constraint that the overall image quality is at least as great as the desired minimum value. The parameter space can be, for example, a parameter space used in any standard optical design software package, for defining the shape of the front and back surface of each element, and each section of the sectioned element. For example, the optical elements are all constrained to be axisymmetric around an optical axis, and the surfaces are even aspherical conic surfaces. Details of how the parameters are defined for an even aspherical conic surface, and for many other types of optical surfaces, are provided, for example, in the Zemax® 13 *User's Manual*, Aug. 19, 2014, Radiant Zemax, published by Zemax LLC, downloaded from <www(dot)zemax(dot)com> on Nov. 16, 2017. Any known optimization algorithm may be used, with any stopping criterion. Although such a search of design parameter space can also be used for designing a conventional imaging system, the search may be much easier for an imaging system with a sectioned optical element as described here, because the contribution to image quality and manufacturing tolerance from each section may be relatively independent of the design of the other sections. This may allow each section to be optimized, or approximately optimized, independently of the other sections, greatly reducing constraints on the optical design. Alternatively, the search over the design parameter space maximizes, or at least tries to increase, the overall image quality subject to the constraint of a given set of manufacturing tolerances, or the search may maximize or try to increase a single figure of merit that depends on a combination of overall image quality and insensitivity to manufacturing errors.

An aspect of some embodiments of the invention concerns an optical configuration that could be used to project an image of the field of view in an optical system such as the one described above, even if it is sold as a separate product, not including the sensor array and not including a computer that processes the image. Such a product might be bought, for example, by a cell phone manufacturer, to incorporate into a cell phone camera, using a sensor array manufactured or purchased separately, and using the existing data processing ability of the cell phone to process the image. For at least one field of view defined relative to the optical configuration, the optical configuration projects an image of that field of view to at least one possible focal surface, also defined relative to the optical configuration, where a sensor array could be located. The field of view includes a range of directions, and a range of distances for each direction. The optical configuration includes a sectioned optical element, with a plurality of sections, and each section projects an image of a portion of the field of view to a different part of the focal surface. The different parts of the focal surface do not overlap, though the different portions of the field of view may overlap. In general, there may be many different fields of view, and many different possible focal surfaces for each field of view, for which all this is true for a given lens configuration, with the image possibly in better focus for some focal surfaces than for other focal surfaces. But it is true for at least one field of view and at least one focal surface.

Overview of Projection System

An aspect of some embodiments of the invention concerns a projection system that displays a digital image on a display screen, for example in a heads up display device, and optical elements, for example lenses, which optionally project the displayed image to the eye of a viewer. Alternatively, the optical elements project the displayed image onto an external screen, for example a large screen that can be viewed simultaneously by several people in a room. At least one of the optical elements is divided into sections, and each section projects a different region of the displayed image, coming from a different portion of the original digital image, to the eye of the viewer. Optionally, at least some of the sections differ in size and/or shape. Although the optical elements, including the sectioned element, generally distort the image displayed on the display screen, image processing software distorts the original digital image to create the displayed image, so that the image seen by the viewer, or projected onto the external screen, optionally is substantially an undistorted version of the original digital image, with the different portions of the original digital image smoothly joined together. For example, the image seen by the viewer or projected onto the external screen is optionally much less distorted from the original digital image than is the displayed image. Optionally, the different portions of the original digital image are displayed on non-overlapping regions of the display, and optionally there are gaps between the regions. Optionally, no light is emitted from the gaps, and/or any light emitted from the gaps does not reach the eye of the viewer or the external screen, or reaches the eye of the viewer from a different direction than any of the light that is part of the image projected to the viewer, or reaches a different part of the external screen than the image, so it does not interfere with the image seen.

To a certain extent, the projection system can be considered as the imaging system in reverse, where the original digital image of the projection system corresponds to the final processed image of the imaging system, the image on the display of the projection system after image processing corresponds to the image on the sensor of the imaging system before image processing, and the image projected to the eye of the viewer of the projection system corresponds to the field of view of the imaging system. The sectioned optical element of the projection system, which is often an element relatively close to the display, corresponds to the sectioned optical element of the imaging system, which is often an element relatively close to the sensor. A set of optical elements designed for the imaging system may also work in the projection system, and vice versa. However, there are some differences in the requirements of the imaging system and the projection system. For example, the exit pupil generally has to be great enough, for example at least 6 mm or at least 10 mm or at least 20 mm depending for example on the width of the field of view of the projected image, to accommodate the motion of the pupil of the viewer's eye when the viewer looks in different directions at different parts of the projected image, while there is no corresponding minimum diameter for the front lens of the imaging system. Also, the image processing software in the imaging system optionally makes use of feedback from overlapping portions of the field of view, to adjust the image processing so that the different portions of the field of view are smoothly joined together in the final processed image, while the image processing software of the projection system optionally operates open loop, without any feedback to ensure that the different portions of the digital image are smoothly joined together in the image projected to the viewer.

Optionally, at least some of the different portions of the original digital image for the projection system overlap. A pixel in an overlapping part of the digital image will optionally be displayed twice on the display, at two different locations each in a different one of the regions on the display, and optionally will be projected to the user along two different paths, each going through a different section of the sectioned optical element, and appearing to overlap each other in the image seen by the viewer. In this case, the image processing software optionally adjusts the intensity of the displayed pixels corresponding to the overlapping parts of the original digital image, so that there is a smooth transition through the overlapping parts in the image seen by the viewer.

Optionally, as in the imaging system, the sectioned element has a surface with direction of orientation that is discontinuous at boundaries between sections, at least in some places. Optionally, as in the imaging system, there are gaps between sections, at least in some places. Optionally, the optical elements in the projection system comprise a compact lens with respect to the display screen, according to any of the options given above for the optical elements in the imaging system comprising a compact lens with respect to the sensor.

Optionally, the optical elements of the projection system can be folded down or collapsed when the projection system is not in use. Optionally, the tolerance to fabrication errors is good enough so that, when the optical elements are folded down or collapsed, and then restored to their proper positions when the projection system is used, any resulting errors in relative position of the different optical elements, to each other or to the display do not exceed the tolerances.

As noted above, the optical elements used for the imaging system can, with some exceptions, also be used, in reverse, for the projection system. All of the options described above, for the degree of distortion produced by the optical elements, and for the size and shape of the different portions of the field of view and the images, may also pertain to the projection system, but with the image seen by the viewer of the projection system playing the role of the field of view of the imaging system, and with the display of the projection system playing the role of the sensor of the imaging system, and with the original digital image of the projection system playing the role of the processed image of the imaging system.

Similarly to the imaging system, a projection system of this sort may be designed to have optimized or at least improved tolerance of fabrication errors, for shape and position of the optical elements, while still maintaining a minimum overall image quality in the image viewed by the user, as defined by some measure of image quality. Alternatively, the image quality may be optimized or improved, subject to maintaining at least a minimum tolerance of fabrication errors, or a single figure of merit, based on both image quality and tolerance of fabrication errors, and optionally also on other parameters, may be optimized or improved. As in the case of designing an imaging system, the method of designing the projection system includes searching over a space of design parameters for an optimized or improved figure of merit for the tolerance, the image quality, or both, using any known optimization algorithm. This design method may be easier or more effective than with a projection system of conventional design, because the optimum design for each of the different sections of the sectioned optical element may be, at least to some extent, independent of the design of the other sections, making the parameter space much smaller.

Prior Art Imaging System

For purposes of better understanding some embodiments of the present invention, as illustrated in FIGS. 2-8 of the drawings, reference is first made to the construction and operation of a prior art imaging system, including a typical lens used in a cell phone camera, as illustrated in FIG. 1.

FIG. 1 shows an imaging system 100, typical of systems used in cell phone cameras. An array sensor 102 records light focused on it by a compound lens, comprising a front lens element 104, and additional lens elements 106, 108, 110, and 112 between the front lens and the sensor. A transparent flat plate 114 covers the sensor surface, to protect the sensor surface, and/or to act as a filter. System 100 is designed to have a total track length (TTL), the distance from the front surface of lens element 104 to sensor surface 102, that is small enough, for example less than 5 mm, to be accommodated within the thickness of the cell phone, and to have a total sensor diagonal length that is greater than that, in order to provide a sensor with reasonably high resolution, high sensitivity, and low noise. In addition, the lens is designed to have a relatively low f number, defined as the ratio of the effective focal length, which is approximately the TTL, to the effective aperture, which in this case is the diameter of front lens 104. Having a reasonably low f number is necessary to give the camera a reasonably high sensitivity with low noise and high resolution, and in addition, having a reasonably large effective aperture keeps the resolution from being degraded by diffraction effects. These requirements, which mean that the camera must use a compact lens with high numerical aperture, result in a compound lens with multiple elements, each of a complicated shape, with the need for tight manufacturing tolerances on the shape and on the positioning and orientation of the elements, relative to each other and to the sensor surface, in order to retain good image quality. These tight tolerances, typically on the order of microns for a cell phone camera, preclude the use of a folding or collapsing lens, which might otherwise allow improved performance by making the TTL greater than the thickness of the cell phone. In addition, the need for tight tolerances makes the camera expensive to manufacture, and/or reduces the quality of the image produced by the camera.

FIG. 1 shows sets of light rays 116, 118, 120, 122, 124, 126, 128, 130, 132, 134, and 136, each set of light rays coming from a different direction in the field of view of the camera, and each set focused on a different location on sensor surface 102. Each set of light rays includes one marginal light ray coming from the top edge and one marginal light ray coming from the bottom edge of the front surface of front lens element 104, and a chief light ray going through the middle of front lens element 104.

It should be noted that each set of light rays overlaps with its neighboring sets of light ray when it passes through lens element 112, and there is even more overlap when the light rays pass through any of the other lens elements. This means that, in contrast to the imaging system shown in FIG. 2, lens element 112, or any of the other lens elements, cannot be divided into sections, such that all of the light rays passing through each section end up in their own region of sensor surface 102, with no overlap between the regions. For any division of lens element 112 into sections, some of the light rays going through one section will end up at the same location on sensor surface 102 as some of the light rays going through a neighboring section. This is one difference between imaging system 100, and the imaging system shown in FIG. 2. This means that any change in the shape of lens 112 in any one region will affect the image quality over a region of sensor surface 102 that overlaps with the region of sensor surface 102 for which the image quality is affected by another region of lens element 112. This interdependence of the effect of the shape of different regions of lens element 112 on the image quality at different regions of sensor surface 102 may make it impossible to optimize the shapes of different regions of lens element 112 independently of each other, and that is also true of the other lens elements. Instead, the entire lens design may have to be optimized at the same time. This makes it difficult to optimize the lens design, and tends to cause the image quality of the lens design to have great sensitivity to fabrication errors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Imaging System with a Sectioned Optical Element

Figure 2:
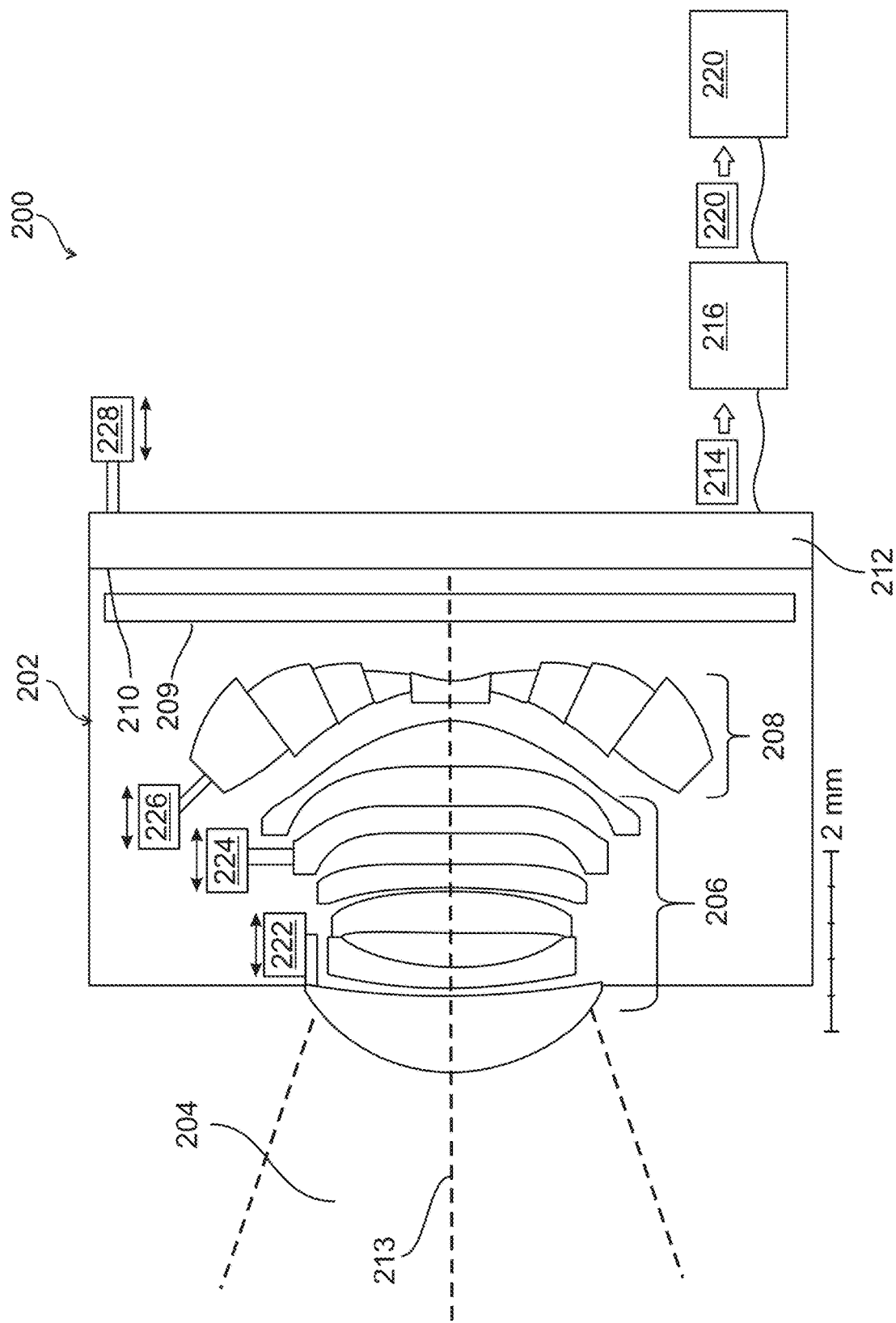
FIG. 2 is a schematic drawing of an imaging system according to an exemplary embodiment of the invention.

Referring now to the drawings, FIG. 2 illustrates an imaging system 200 according to an exemplary embodiment of the invention. A camera 202 makes an image of a field of view 204, using one or more lens elements 206 that are not divided into sections, and a sectioned lens element 208. The lens elements together project an image of the field of view onto a surface 210 of an image sensor 212, for example an image sensor comprising an array of light sensing elements, with the image sensor converting a detected image into a digital image file, for example with each sensing element corresponding to one pixel of the image. A flat plate 209, similar to plate 114 in FIG. 1, optionally protects sensor surface 210, or acts as a filter. In the example shown in FIG. 2, the lens elements are all axisymmetric around a longitudinal axis 213, and the sections of lens element 208 are each annular, centered around axis 213. Sectioned lens element 208 has the property that light rays passing through each section come from different portions of the field of view, and end up in a different region of sensor surface 210, with the different regions not overlapping. The different portions of the field of view may overlap, but optionally only overlap by a small amount. Generally, the image of field of view 204 that appears on sensor surface 210 is distorted, but this distortion is corrected by image processing software. Sensor 212 sends an uncorrected image file 214 to an image processing module 216. The uncorrected image file corresponds to the distorted image that is projected onto sensor surface 210. Image processing module 216 corrects these distortions in image file 214, and smoothly joins the images of the different portions of the field of view together, in addition to optionally performing other image processing tasks. A resulting corrected image file 218 is then sent to data storage medium 220, for example a camera or cell phone memory card, where the corrected image file is stored. The stored image file can then be used like any other digital image file, for example viewing it, uploading it to a computer for backing it up and/or for further image processing, or attaching it to an email.

Imaging system 200 has the potential advantage, over other imaging systems, that the quality of the image from a given small part of the field of view generally depends on the shape and position of only one of the sections of sectioned lens element 208, and not on the shape and position of the other sections. This may make it easier to optimize the design imaging system 200, and in particular sectioned lens element 208, to produce the best overall quality image for all locations in the field of view, or at least to produce an improved image quality, even it is not absolutely maximized. This independence of the effects of the different sections on the image quality may also make it possible for the image quality of the design to have much lower sensitivity to fabrication errors, in shape, orientation and position of the optical elements, than for a conventional imaging system such as that shown in FIG. 1. Similarly, the independence of the different sections may make it easier to maximize or improve the manufacturing tolerances that will allow a given image quality, or to maximize or improve the image quality that can be obtained for a given set of manufacturing tolerances, or to maximize or improve a figure of merit that depends on both image quality and on the sensitivity of image quality to fabrication errors, with the figure of merit being higher for lower sensitivity. The decreased sensitivity, in turn, may make it possible for camera 202 to use a folding or collapsible lens, where the different lens elements can be collapsed when the camera is not in use, for example to fit into the small confines of a cell phone, and extended again when the camera is in use, allowing the TTL to be much greater, potentially allowing the camera to have much better image quality and resolution than a conventional cell phone camera for which the TTL is constrained to be very small. For example, such a camera could have real zoom, as opposed to the digital zoom that is commonly found in cell phone cameras. Also, the possibility of using increased manufacturing tolerances may make the camera less expensive to manufacture.

Although sectioned lens element 208 is shown as the closest lens element to sensor surface 210 in FIG. 2, the sectioned lens element need not be the closest lens element to the sensor surface. However, it may be easier to design a sectioned lens with the property that light passing through each section does not overlap on the sensor surface with light passing through a different section, if the sectioned lens element is relatively close to the sensor surface, as in FIG. 2. In some embodiments of the invention, there may be more than one sectioned lens element. In general, as seen in FIG. 2, the different sections of sectioned element 208 need not have surfaces that are continuous from one section to the next, but may have sharp steps between sections. If sectioned element 208 is made in one piece from molded plastic, under high pressure in a rigid mold, which may be the most economical method of manufacturing it, then one section should not overhang another section, but rather the steps should be oriented at an angle that allows the lens to be removed from the rigid mold, once it has hardened. This is true of sectioned element 208 in FIG. 2.

Optionally one or more of the lens elements, and/or the entire lens, are coupled to actuators, such as actuators 222, 224, and 226 in FIG. 2, which allow the lens elements to move relative to each other and/or relative to the sensor surface, in order to focus the image on the sensor surface. Additionally or alternatively, sensor 212 is coupled to an actuator 228, which allows sensor surface 210 to move relative to the lens elements, in order to focus the image on the sensor surface. The actuators may be any type of motor or actuator suitable to use for moving camera lens elements, for example piezoelectric actuators or motors, or voice coil motors. It should be noted that actuators 222, 224, 226 and 228 are not necessarily drawn to scale in FIG. 2, and may be very different in shape and size, relative to the optical elements, than shown.

Optionally, the focusing of the lens elements is performed automatically, for example using feedback from sensor 212 in an attempt to make the image as sharp as possible. Alternatively, the focus function is performed manually by a user of the camera, using a user interface to electronically control the actuators, or the user can focus the camera by using a non-electronic mechanism to move the lens elements. Optionally the user has an option to perform the focusing manually or automatically. If electronic actuators are used to control the positions of the lens elements, then optionally the actuators comprise piezoelectric actuators. Optionally, the lens elements move parallel to the direction of axis 213, and this is typically true when the lens elements are cylindrically symmetric around axis 213, as shown in FIG. 2.

Optionally, the relative motion of the lens elements relative to each other, and/or relative to the sensor surface, is also used to achieve a zoom effect, changing the effective focal length of the camera, and changing the width of the field of view. Optionally, the zooming is controlled by a user of the camera, using a user interface to control the actuators electronically, or using a non-electronic mechanism to manually move the lens elements. Optionally, the zooming is done by moving one or more lens elements, for example lens elements that are cylindrically symmetric around axis 213, in a direction along axis 213.

Optionally, the actuators, or other actuators, are also used to collapse or fold the optical elements, if system 200 is a folding or collapsible imaging system. Using a sectioned optical element may be especially useful for a folding or collapsible imaging system, since such systems generally require much greater tolerances in positioning of the optical elements, than a fixed imaging system would require.

Optionally, sensor 212 performs some preliminary image processing internally, before sending image file 214 to image processing module 216. For example, sensor 212 may perform some image processing in real time, while the camera is taking a picture, in order to perform image stabilization on the image, compensating for motion of the camera and/or for motion of one or more objects in the field of view. In general, any image processing may be done either by dedicated hardware within the sensor, or elsewhere within the camera, or by software running on a general computing device, such as a cell phone or personal computer, that the camera is connected to, or is part of. Although sensor 212 and image processing module 216 are shown as separate elements of FIG. 2, to reflect a division between immediate low level image processing done by the sensor and higher level image processing done by the module, optionally such a division does not exist, and the functions described as being done by sensor 212 and by module 216 may be done by a single processor. Alternatively, the image processing functions described as done by sensor 212 and by module 216 may be done by more than two different processors, and over an extended period of time. For example, processing the uncorrected image file produced by sensor 212, to smoothly join the different regions together, may be performed later by a personal computer, after the uncorrected image file is uploaded to it. But if camera 202 is used as a cell phone camera, then it may be most convenient for the image processing to be done automatically, using software that runs on the cell phone, every time a picture is taken, so a user sees only the processed image.

Although any wide angle lens will generally project a distorted image of the field of view on a flat sensor, optionally the image projected by the optical elements is much more distorted than it would have to be, for the width of its field of view. As used herein, the degree of distortion between two locations in an image means the percentage increase in magnification between the location with the smaller magnification and the location with the larger magnification. The degree of distortion in the image as a whole, or in a region of an image, means the maximum percentage increase in magnification between any two locations in the image, or between any two locations in that region of the image. In general the magnification may be anisotropic, with a small square in the field of view projected to a small rectangle or rhombus or parallelogram in the image. In that case, assuming that the sensor is planar, the degree of distortion between two locations in the image is defined as the maximum percentage increase in the component of magnification in any given direction on the plane of the sensor, between the location where the component of magnification is smaller and the location where the component of magnification is larger. The degree of distortion in the image as a whole, or in a region of the image, is the maximum percentage increase in the component of magnification in any given direction on the plane of the sensor, between any two locations in the image, or in that region of the image. In general, when there is distortion in the image by this definition, then straight lines in the field of view will project to curved lines in the image.

For example, for at least two directions in the field of view that are less than 10 degrees, or less than 20 degrees, or less than 30 degrees, or less than 45 degrees, or less than 60 degrees, from a central direction of the field of view, the degree of distortion for the two directions is at least 1%, or at least 2%, or at least 5%, or at least 10%, or at least 20%. Optionally, within at least one of the different regions of the image, projected by different sections of the sectioned lens element, the distortion is at least 1%, or at least 2%, or at least 5%, or at least 10%, or at least 20%. Optionally this is true for at least one region of the image that extends out to no more than 10 degrees from the central direction of the field of view, or to no more than 20 degrees from the central direction, or to no more than 30 degrees from the central direction, or to no more than 40 degrees from the central direction.

Figure 3:
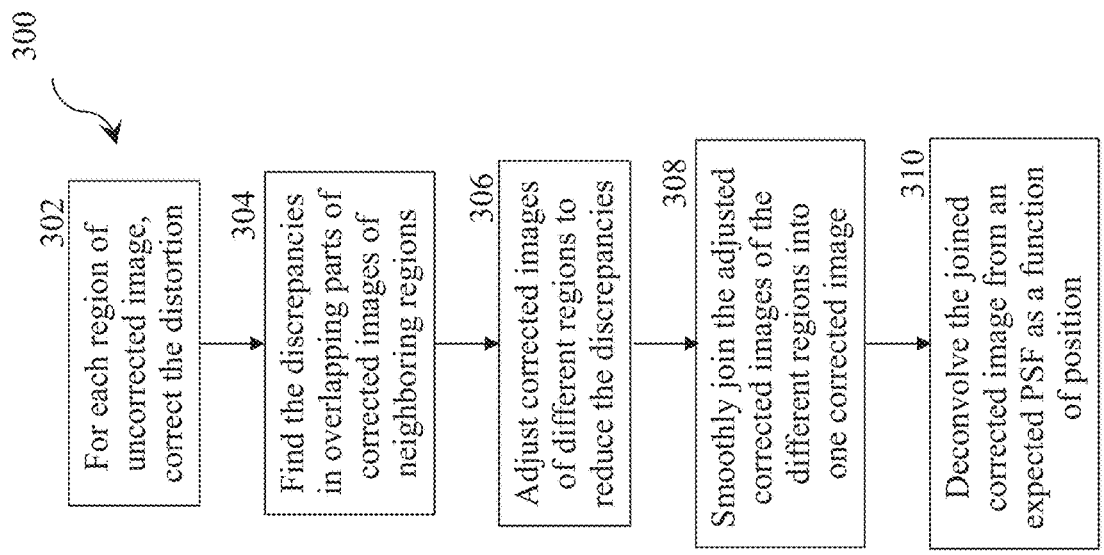
FIG. 3 is a flowchart for an image processing method used in the imaging system of FIG. 2.

FIG. 3 shows a flowchart 300 showing some details of an algorithm used by image processing module 216 to process uncorrected image file 214 to produce corrected image file 218, according to an exemplary embodiment of the invention. At 302, each of the regions of the uncorrected image, corresponding to the different regions of sensor surface 210 on which light passing through different sections of lens element 208 is projected, is corrected for distortion. As noted above, light from different portions of field of view 204 passes through different sections of lens element 208, and is all projected to its own region of sensor surface 210, with no overlap of the different regions. Optionally, which pixels of sensor surface 210 correspond to which region is known, for example from ray tracing calculations that were used to design the lens elements. Optionally, the different regions not only do not overlap, but there are gaps between them, where no light is projected from any section of lens element 208. In that case, the uncorrected image itself can be used to determine which pixels belong to which region, or at least to verify and/or adjust the expectations of where the regions are based on the ray tracing calculations, because the regions will be separated by pixels that receive little or no light.

Typically, a lens design that has the feature that all light passing through a given section of lens element 208 will be projected to its own separate region, will produce a somewhat distorted image of field of view 204. For example, the image may be locally distorted anisotropically near the edge of the regions, with the image more compressed in a direction perpendicular to the edge, than in a direction parallel to the edge. The ray-tracing calculations that were used to design the lens elements are optionally used to find a mapping of the directions in each portion of the field of view to the pixels in the corresponding region of uncorrected image 214. Once this mapping is known, a warping transformation is found that transforms the pixels of each region to pixels in a corrected image of the field of view, with less distortion of the field of view than the uncorrected images have. Usually, the warping transformation will map a pixel in the uncorrected image to a location between pixels in the corrected image. When this happens, the image intensity of a pixel in the corrected image is optionally based, for example, on the image intensity of the nearest pixel in the warped uncorrected image, or on a weighted average of the image intensities of several closest pixels in the warped uncorrected image.

Although any mapping from directions in the field of view (corresponding to points on the surface of a sphere) to pixels in a planar image necessarily has some distortion, the mapping from the directions of the field of view to the corrected image optionally has relatively little distortion, at least less distortion than the mapping from the field of view to each region of the uncorrected image. For example, optionally there is a single smooth continuous mapping for all portions of the field of view and all regions of the corrected image. This means, for example, that for any direction in the field of view that is in an overlapping part of two portions of the field of view, the warping transformations for the corresponding two regions will map that direction in the field of view to the same pixel in the corrected image.

Optionally, the mapping from directions in the field of view to pixels in the corrected image is similar to the mapping for a lens in a conventional digital camera. For example, if the field of view is not too wide, then a direction at an angle $\theta$ to the direction of axis 213, at an azimuthal angle $\phi$, optionally maps to a pixel in the corrected image with coordinates $x = F \cdot \tan\theta \cdot \cos\phi$, and $y = F \cdot \tan\theta \cdot \sin\phi$, where F is the focal length of the lens. If the field of view is very wide, for example extending to $\theta = 90$ degrees, then this mapping would extend to infinity, and a different mapping is optionally used, for example the mapping that would occur with a fish-eye lens. Although any mapping from the directions of the field of view to the pixels of the corrected image may be used, a potential advantage of using a mapping similar to the mapping for a lens in a conventional camera is that the resulting corrected image will look similar to the image that most users would expect from a camera.

In addition to applying a warping transformation to correct the distortion in the uncorrected image for each region, when producing the corrected images, optionally corrections are also made to the image intensity of the uncorrected images, since the distorted mapping from directions in the field of view to pixels in the uncorrected image may also result in errors in image intensity in the uncorrected images, that do not correspond to the true image intensity for that direction in the field of view. These corrections in intensity may also be calculated from the ray-tracing calculations made when the lens elements were designed.

If the correction of the distortion in the uncorrected image is done properly for each region of the uncorrected image at 302, then the corrected image for any parts of the field of view that belong to two overlapping portions will be identical for the two regions that correspond to those portions of the field of view. In practice, there may be slight discrepancies between the two overlapping regions of the corrected image, for example due to errors in the shape and/or position of the lens elements, or errors in the ray-tracing calculation or in the calculation of the warping transformations and in the image intensity used to correct the regions of the uncorrected image. There may also be differences in resolution in the two overlapping regions, since, for example, the uncorrected image that is more compressed along one or both axes will have lower resolution on that axis when it is corrected. Also, even if the two images have the same resolution, they may contain different information about the overlapping region if the positions of the boundaries between sensor elements is out of phase in the two images. At 304, the corrected image is examined to find any discrepancies in the overlapping regions. At 306, small adjustments are optionally made to the warping transformations and in the corrections to image intensity for each region of the uncorrected image, in order to reduce or, ideally, eliminate the discrepancies, and the corrected image of each region is calculated again, using the adjusted transformations and corrections in intensity. In addition, information in the higher resolution image of the overlapping region, or information in both images of the overlapping region, is optionally used to make the overlapping region match in both images, and ideally to have as high a resolution as possible, which may even be higher than the resolution of either image individually. Optionally, the new corrected image is again examined to find any remaining discrepancies in the overlapping regions, and 304 and 306 are iterated if necessary until the discrepancies have disappeared or fallen below some threshold level.

Alternatively, adjustments are made at 306 directly in the corrected images. But making the adjustments in the transformations and in the corrections to intensity has the potential advantage that, if the discrepancies are due to an error in the lens elements or an error in the ray-tracing or in the transformations, then the adjusted transformations and corrections in intensity may produce smaller discrepancies if used when making other images afterwards. Whether the adjustments are made to the transformations and corrections in intensity, or directly to the corrected images, algorithms for making such adjustments, based on discrepancies in overlapping parts of the image, may be similar to algorithms used in prior art stitching software, that joins several images into a single smooth panoramic image, for example. Any techniques used in such software may optionally be used in the software that makes the adjustments at 306. For example, any of the techniques described in the Wikipedia articles on "Image stitching" may be used.

This article was downloaded from <https://en(dot)wikipedia(dot)org/wiki/Image_stitching> on Aug. 15, 2018.

In some embodiments of the invention, the distortion in the image is small enough, for example less than 1% or less than 2%, that it is not apparent to a viewer at all, except in narrow areas near the boundaries of the regions, for example within the overlapping parts of the regions, where the distortion is greater. Errors in image intensity may also be too small to be apparent to a viewer, except near the boundaries of the regions, for example within the overlapping parts. In this case, the correction of distortions and image intensity at 302 is optionally not performed at all, and the distortions and errors in image intensity in the overlapping regions are corrected at 304, optionally making use of information from the two overlapping regions.

At 308, the corrected images of the different regions, with any adjustments made at 306, are joined into a single corrected image, optionally in a way that will make the single image look smooth at the transitions between the different regions, ideally smooth enough so that the transitions between the different regions will not be apparent at all. Since the corrected images of the different regions have already been adjusted at 306 so that their overlapping parts match, joining the corrected images of the different regions into a single image is straightforward.

At 310, the corrected image is optionally deconvolved from an expected point spread function (PSF), that in general depends on the location in the image. The PSF is the pattern of intensity that would be created in the image by a point-like light source in the field of view, in focus on the surface of the sensor. Effects that contribute to the PSF include the effects of aberration of the lens elements, and the effects of diffraction of light due to the finite aperture of the lens elements. For example, the PSF for a circular aperture, with a single wavelength of light much shorter than the diameter of the aperture, and ignoring aberration, is azimuthally symmetric and has a radial dependence that is an Airy function. An image made of a scene in the field of view, all in focus, for example with the light sources all at infinity, will be the convolution of the PSF with a mapping of the scene. If the design of the lens elements is known, then in principle the PSF can be calculated, and it may be possible to remove the effects of aberration and diffraction from the image by deconvolving the PSF from the image, at least if the image is made using incoherent light with a known distribution of wavelengths coming from each direction in the field of view.

Deconvolving a PSF from an image can be done most effectively if the PSF does not have any zeroes, or at least has zeroes only far out on its edges where it is very small. Deconvolving a PSF with zeroes in it from an image will involve inverting an ill-conditioned matrix, producing a deconvolved image with a lot of noise in it. One way to obtain a better behaved PSF is to use an aperture that has a reduced transmission coefficient near its edge, rather than having a sharp edge where the transmission coefficient goes abruptly from close to its maximum value to 0%. Optionally, imaging system 200 has such an aperture, using a filter, not shown in FIG. 2, with radially varying transmission coefficient in front of the lens elements, or elsewhere in the optical path. For example, a Gaussian aperture, with a transmission coefficient that is a Gaussian function of radial distance, would have a PSF due to diffraction that is also a Gaussian, with no zeroes. Even if the transmission coefficient goes to zero at some radius, as it would if the diameter of the aperture is not infinite, the zeroes in the PSF would still be far out at the edge of the PSF, where it is exponentially small, if the transmission coefficient of the aperture goes to zero only at a radial distance that is several times the width of the Gaussian, and these zeroes in the PSF would produce very little noise when the PSF is deconvolved from the image. Optionally the imaging system uses such a Gaussian aperture.

In some embodiments of the invention, instead of or in addition to deconvolving the PSF from the image at 310, after correcting the distortion in the images of the different regions and joining them into a single corrected image, the PSF is deconvolved from the images of the different regions before joining them, before and/or after correcting the distortion, or together with correcting the distortion. For example, an integral operator, operating on the uncorrected image, optionally corrects the distortion as well as deconvolving the PSF from the image at the same time.

It should be noted that, in practice, the spacing of sensor elements in the sensor array may be comparable to the width of the PSF, and in that case, it may not be very important to deconvolve the PSF very accurately, for example using a Gaussian aperture or a nearly Gaussian aperture, but it may be sufficient to deconvolve the PSF in an approximate way.

Figure 4:
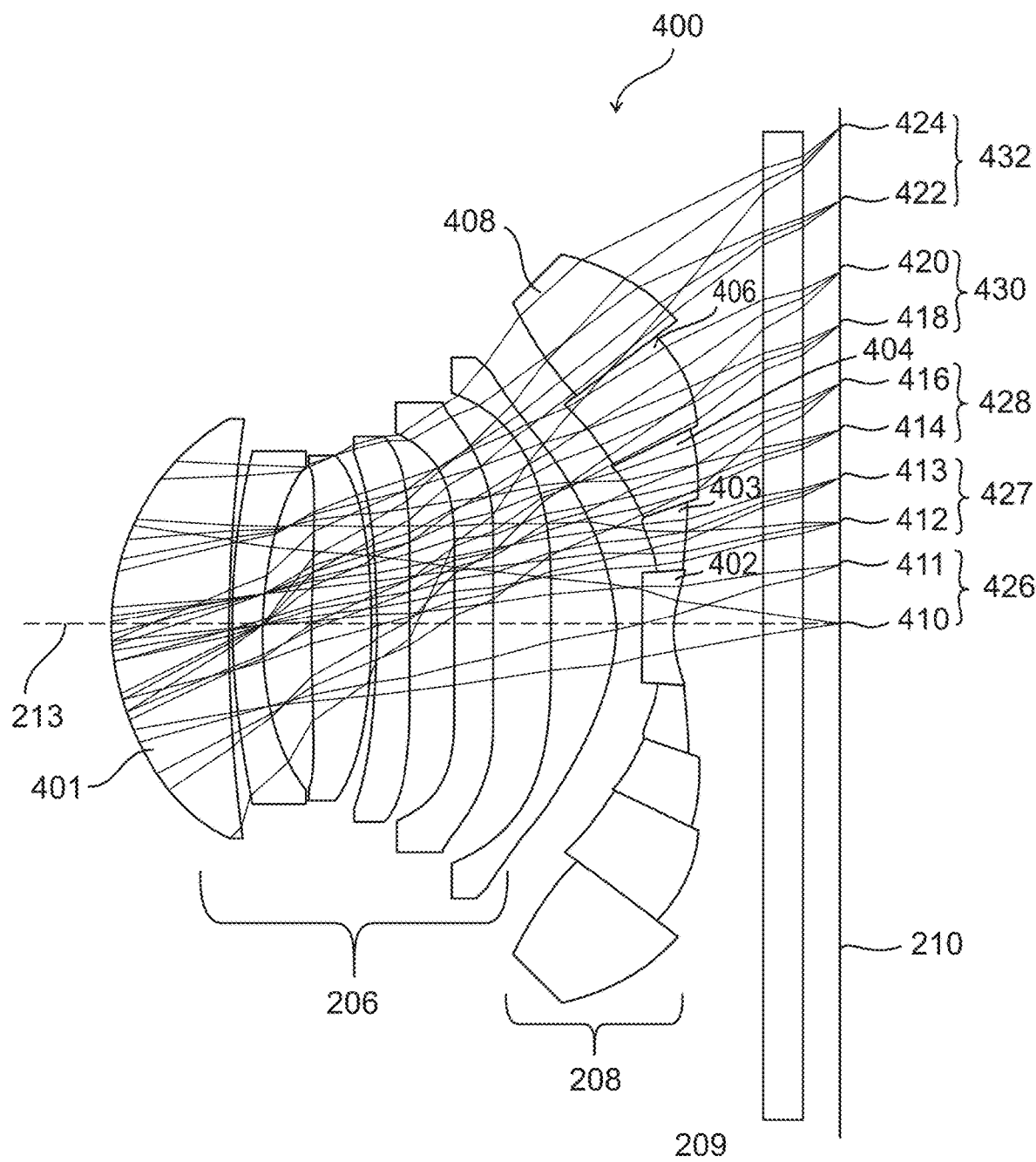
FIG. 4 is a schematic cross-sectional view of lenses used in the imaging system shown in FIG. 2, showing rays of light traced from the field of view of the image to the sensor.

FIG. 4 shows a schematic side cross-sectional view 400 of the lens elements 206 and 208 and sensor surface 210 shown in FIG. 2, together with paths of light rays coming from the field of view, showing how light rays that are focused on the sensor surface after passing through a given section of the sectioned lens element all go to the same region on the sensor surface, with no overlap between the regions for the different sections. In FIG. 4, lens elements 206, including a front lens 401, and sectioned lens element 208, are axisymmetric around an axis 213. Sectioned lens element 208 has a central circular section 402, centered on axis 213, and annular sections 403, 404, 406, and 408, surrounding axis 213. Light rays are shown that are focused on sensor surface 210 at point 410, which is on axis 213, and at points 411, 412, 413, 414, 416, 418, 420, 422, and 424, which are above axis 213. For clarity, light rays that focus on points below axis 213 are not shown in FIG. 4. For each of these points, except point 411, three light rays are shown, an upper light ray coming from the top of lens 401, or approximately from as high up on lens 401 as any light ray that reaches that point, a lower light ray coming from the bottom of lens 401, or approximately from as far down on lens 401 as any light ray that reaches that point, and a central light ray that comes from somewhere between the upper and lower rays on lens 401. For point 411, only two light rays are shown. Other light rays, that pass through the lens elements and focus on one of these points, generally follow paths that are between the paths of the upper and lower light rays for that point, although for some points there may be other light rays, not shown, that follow paths that are a little above the upper light ray or a little below the lower light ray.

It should be noted that all of the light rays that pass through section 402 end up in a same region 426 of sensor surface 210, which includes points 410 and 411, and no light rays that pass through any of the other sections end up in region 426 of the sensor surface. Similarly, the light rays that pass through section 403, and only the light rays that pass through section 403, end up in region 427, which includes points 412 and 413. The light rays that pass through section 404, and only the light rays that pass through section 404, end up in region 428, which includes points 414 and 416. The light rays that pass through section 406, with one exception to be described shortly, and only those light rays, end up in region 430, which includes points 418 and 420. The light rays that pass through section 408, and only those light rays, end up in region 432, which includes points 422 and 424. However, the lower light ray that ends up at point 424 in region 432 also barely passes through the upper left corner of section 406, in addition to passing through section 408. That light ray passes through the very bottom part of front lens element 401. If front lens element 401 were stopped down slightly, covering or removing a small part of its outer edge, as optionally could be done in practice, then all the light rays reaching point 424, or any other point in region 432, would pass only through section 408, and not through section 406 or any other section, and all of the light rays that pass through section 406 will end up only in region 430, and not in any other region. The lower light ray that ends up at point 424 could also be eliminated by having a narrow gap between sections 406 and 408, for example an opaque gap, optionally produced by putting an opaque covering over a narrow annular part of the front and/or back surface of sectioned lens element 208 at the boundary between sections 406 and 408. For the rest of the description of FIG. 4, it will be assumed that front lens element 401 is stopped down slightly, and/or there is a narrow gap between sections 406 and 408, and optionally between other sections as well, so that all light rays that go through a given section only reach points in the region of the sensor corresponding to that section.

In this respect, the lens elements and sensor surface shown in FIG. 4 differ from the prior art lens elements and sensor surface shown in FIG. 1. In FIG. 1, no matter where section boundaries are drawn in lens element 112, or in any of the other lens elements, one cannot define non-overlapping regions on the sensor surface such that all light rays that pass through each section are focused on only one region, a different region for each section. This cannot be done for the lens elements and sensor surface shown in FIG. 1, because the light rays reaching different points on the sensor surface cross each other within each of the lens elements, including lens element 112. In FIG. 4, by contrast, light rays going to each of regions 426, 427, 428, 430, and 432 do not cross each other, within lens element 208. This result is achieved because, for nearby points in different regions, neighboring light rays are approximately parallel to each other when they pass through neighboring sections in sectioned lens element 208, and they are approximately parallel to the boundaries between sections. For example, the upper light ray going through section 402 to point 411 is approximately parallel to the lower light ray going through section 403 to point 412, and both those light rays are approximately parallel to the boundary between sections 402 and 403. Similarly, the upper light ray going to point 413 is approximately parallel to the lower light ray going to point 414, and both are approximately parallel to the boundary between sections 403 and 404. Similarly, the upper light ray going to point 416 is approximately parallel to the lower light ray going to point 418, and both are approximately parallel to the boundary between sections 404 and 406. Similarly, the upper light ray going to point 420 is approximately parallel to the lower light ray going to point 422, and both are approximately parallel to the boundary between sections 406 and 408. It is this property of lens elements 206 and 208, and their position relative to sensor surface 210, that makes the image quality within each region of sensor surface 210 dependent on the shape and location of only one of the sections of lens element 208, and not on the other sections.

The configuration of the lens elements in the FIG. 4, including sectioned element 408, illustrates a solution to the problem of how to produce an in-focus image of a wide field of view over a wide sensor with a relatively short total track length. The front lens elements, on the left side of FIG. 2, are on average convex, with positive focal length (positive optical power), because they have to make the light rays coming from each portion of the field of view converge on only one section of the sectioned element. Once the light rays from different directions in the field of view have localized somewhat in the radial direction (the vertical direction in FIG. 4), at the middle lens elements, and especially at the lens element just to the left of sectioned element 208, the lens elements are concave, with negative focal length (negative optical power), at larger radial position, near the top of FIG. 2, and are convex, with positive focal length (positive optical power), at smaller radial position, closer to the optical axis. This allows the light rays coming from directions in the field of view that are further from the optical axis to travel the longer distance to the sensor, that they must traverse diagonally, while the light rays coming from directions closer to the optical axis have to travel a shorter distance to the sensor. However, the light rays coming from the directions further from the optical axis are optionally converging very little, or not converging at all, when they reach sections 406 and 408. This may be done, for example, so that the light rays will all be approximately parallel to the boundaries between the sections, and no light rays will cross from one section to another, in going through sectioned element 208. So outer sections 406 and 408 are convex, with positive focal length, to make the light rays from a given direction in the field of view converge when they reach sensor surface 210. While the light rays coming from directions nearer to the optical axis are already converging a little too quickly when they reach section 402, and section 402 is slightly concave, with negative focal length, to make light rays coming from a given direction converge at sensor surface 210. These features may also be present in the conventional lens elements of FIG. 1, with lens element 112 playing a role similar to sectioned element 208. But because lens element 112 is constrained to have a smoothly varying surface curvature, its local focal length changes continuously and rapidly in the radial direction, the vertical direction in FIG. 1. As a result, even a small radial displacement in lens element 112 may have a big effect on where the light rays go when they pass through lens element 112, and how close to the sensor surface they converge. With sectioned lens element 208 in FIG. 2, on the other hand, the local focal length does not vary so much across each section, but only changes very much in going from one section to another. As a result, a small radial displacement in one of the sections may have much less effect on where the light rays converge after they pass through sectioned element 208. This may mean that a given radial displacement in sectioned element 208 may have much less effect on image quality than the same radial displacement of element 112, and as a result the image quality of system 400 may have a much less sensitivity to positioning errors than the image quality of system 100. If this analysis is correct, then a critical feature of section element 208, which accounts for its smaller sensitivity of image quality to manufacturing errors, may be the fact that the optical power of each section is relatively uniform within that section, and jumps discontinuously in going from one section to another section.

Similarly, the average surface orientation of the sections of sectioned element 208 is different for sections that are further from the optical axis, than for sections that are close to the optical axis, so that the light rays are all travelling approximately normal to the surface when they go through the different sections. This may also be true of lens element 112 in FIG. 1, but in sectioned lens element 208, the surface orientation can change discontinuously at the boundaries between sections, and can be better optimized within each section, possibly making the surface orientation less sensitive to displacements in the position of the lens element. Finally, in sectioned lens element 208, the different sections can be displaced axially relative to each other, with steps between sections. This may make it possible to better optimize the axial position of each section, for example moving outer sections 408 and 406 closer to sensor surface 210, than would be possible if the lens element could not have any steps. All of these features of sectioned element 208 may contribute to improving the performance and sensitivity to fabrication errors of the optical system shown in FIGS. 2 and 4.

FIG. 5A schematically shows an example of an uncorrected image 500 projected onto a sensor surface 210, by an optical configuration with a sectioned lens element, similar to the configuration of imaging system 200 in FIG. 2. An uncorrected image made by system 200 would look qualitatively similar. The image is of a rectangular grid, located on a plane, parallel to the sensor surface, in the field of view of the imaging system, and with the lens elements positioned so that they project a focused image of the grid onto the sensor surface. Image 500 has a central region 426, surrounded by annular regions 427, 428, 430, and 432, corresponding to the regions with the same label numbers in FIG. 4. As in FIG. 4, the light reaching these regions goes respectively through a central section and four concentric annular sections of the sectioned lens element. Between regions 427 and 428, there is a dark gap 502, which no light reaches from any section of the sectioned lens element. Similar dark gaps occur between regions 428, 430, and 432. Regions 426 and 427 have little if any gap between them, though the image is darker in the vicinity of the boundary between regions 426 and 427. It should also be noted that a black coating optionally applied to the sectioned lens element, at narrow boundary regions between the sections, helps to prevent unwanted light rays from reaching the gaps, or other parts of the sensor, from the boundary regions, including light scattering from the steps between sections. Optionally, the sectioned lens element is shaped so that there would be no gaps, or the images from the different sections would even overlap slightly, if there were no dark coating in the boundary regions, and the dark coating ensures that the images from the different sections have gaps between them, or at least do not overlap. Alternatively, there would be dark gaps between the images from the different sections, or at least no overlap between the images, even without the dark coating, but the dark coating makes the dark gaps wider, which potentially may make it easier for the image processing software to distinguish between the images.

One can see, from the appearance of the rectangular grid in image 500, the distortions in the uncorrected image, which are about 10% over the whole image, as well as over each of regions 427 and 428. Each region of image 500 is somewhat compressed radially, near its edges. Also, parts of the field of view, near the edges of the portions of the field of view that are projected into each region, are projected into two adjacent regions, and appear twice in image 500. These are the overlapping parts of the portions of the field of view. It is these distortions in the uncorrected image that are corrected by image processing module 216, as described above in the description of FIG. 3, and it is these overlapping portions of the field of view that are checked for discrepancies, and used to make adjustments in the correction of the distortions, as described in the description of FIG. 3.

The inner and outer edges of the regions in FIG. 5A tend to be darker than the part of the region away from the inner and outer edges. This may be due to the fact that the image in an outer edge part of each region is duplicated in an inner edge part of the next region further out. Because the light from those parts of the field of view is divided between the two regions, those parts of the image are dimmer, although this effect may be partly compensated by the radial compression of these parts of the image. The light rays contributing to the two copies of those parts of the image may come through different parts of the front lens element. This may be seen in FIG. 4, which is similar to the optical configuration used to generate the image in FIG. 5A. For points 412, 414, 418, and 422, which are located near the inner edges of regions 427, 428, 430, and 432 respectively, the upper light rays come from near the top of front lens 401, while the lower light rays come from a little below the middle of front lens 401. The light rays that contribute to these parts of the image come mostly through the upper part of front lens 401, that is from the same side of front lens 401 as the side of the image where these points are located. For points 411, 413, 416, and 420, which are located near the outer edges of regions 426, 427, 428, and 430 respectively, the upper light rays come from a little above the center of front lens 401, and the lower light rays come from near the bottom of front lens 401. The light rays that contribute to these parts of the image come mostly through the lower part of front lens 401, that is from the opposite side of front lens 401 to the side of the image where the points are located. And point 410, which is located at the center of region 426, and point 424, which is located near the center of region 432, have upper rays that come from near the top of front lens 401, and lower rays that come from near the bottom of front lens 401. The light rays that contribute to these parts of the image may come from all of front lens 401.

Figure 5B:
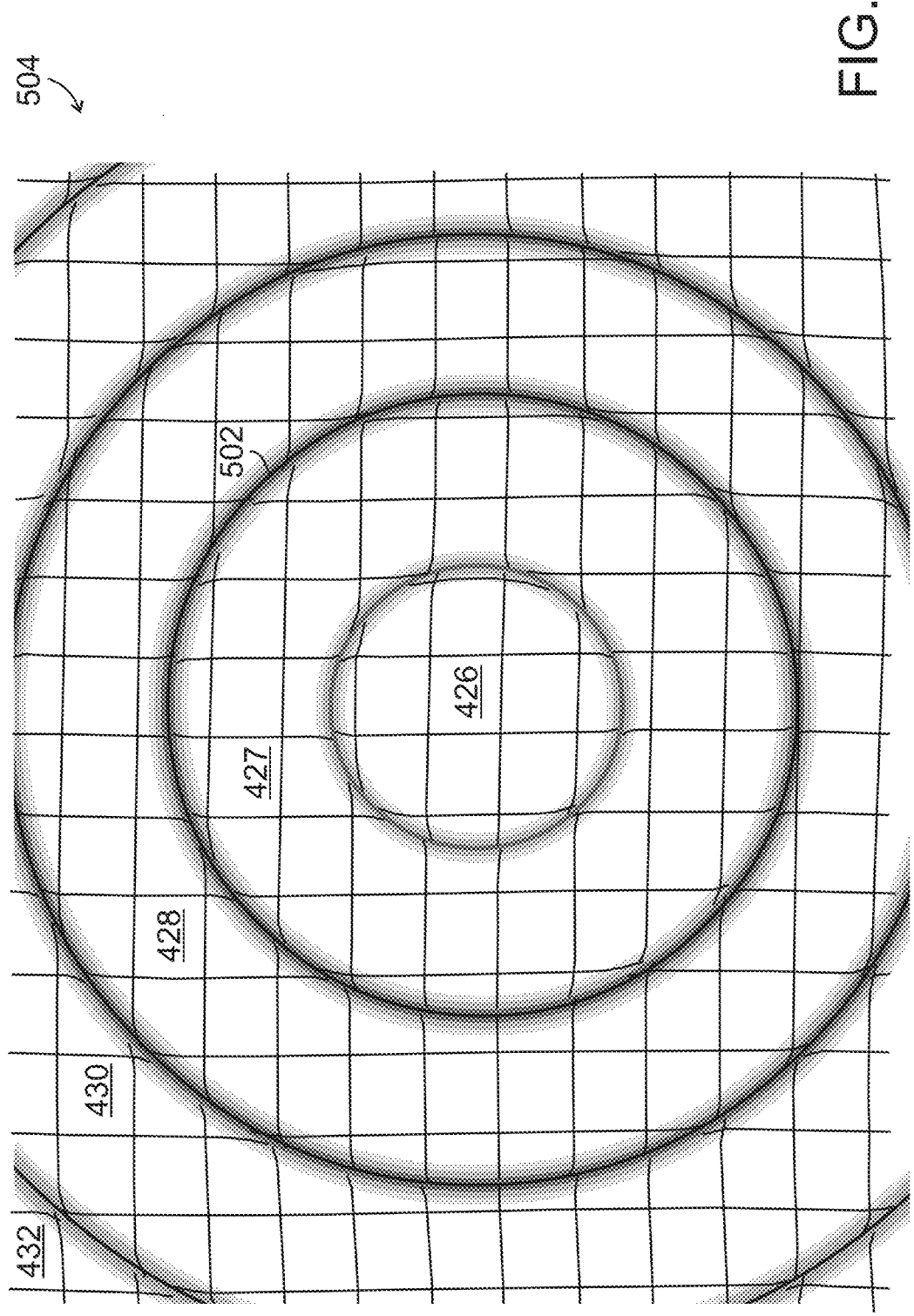

In some embodiments of the invention, the image produced on the sensor array has distortion much less than the approximately 10% distortion seen in image 500. For example, the distortion is only 1% or 2%, not enough to be readily seen by a viewer. In this case, the lines in the uncorrected image of a rectangular grid will look like evenly spaced straight lines, crossing each other at right angles, over most of the image, but near the boundaries of the regions, the lines may bend slightly, and may be visibly discontinuous in going from region to another, and the light intensity may be visibly reduced in narrow bands around the boundaries, particularly in parts of the image that are duplicated because they correspond to overlapping parts of different regions of the field of view. Optionally in this case, the distortion need not be corrected over most of the image, but the image is optionally corrected near the boundaries of the regions, for example by a stitching algorithm, so the images in the different regions join smoothly together, and to eliminate the dark bands. FIG. 5B shows an example of such an uncorrected image 504.

Projection System with a Sectioned Optical Element

Figure 6:
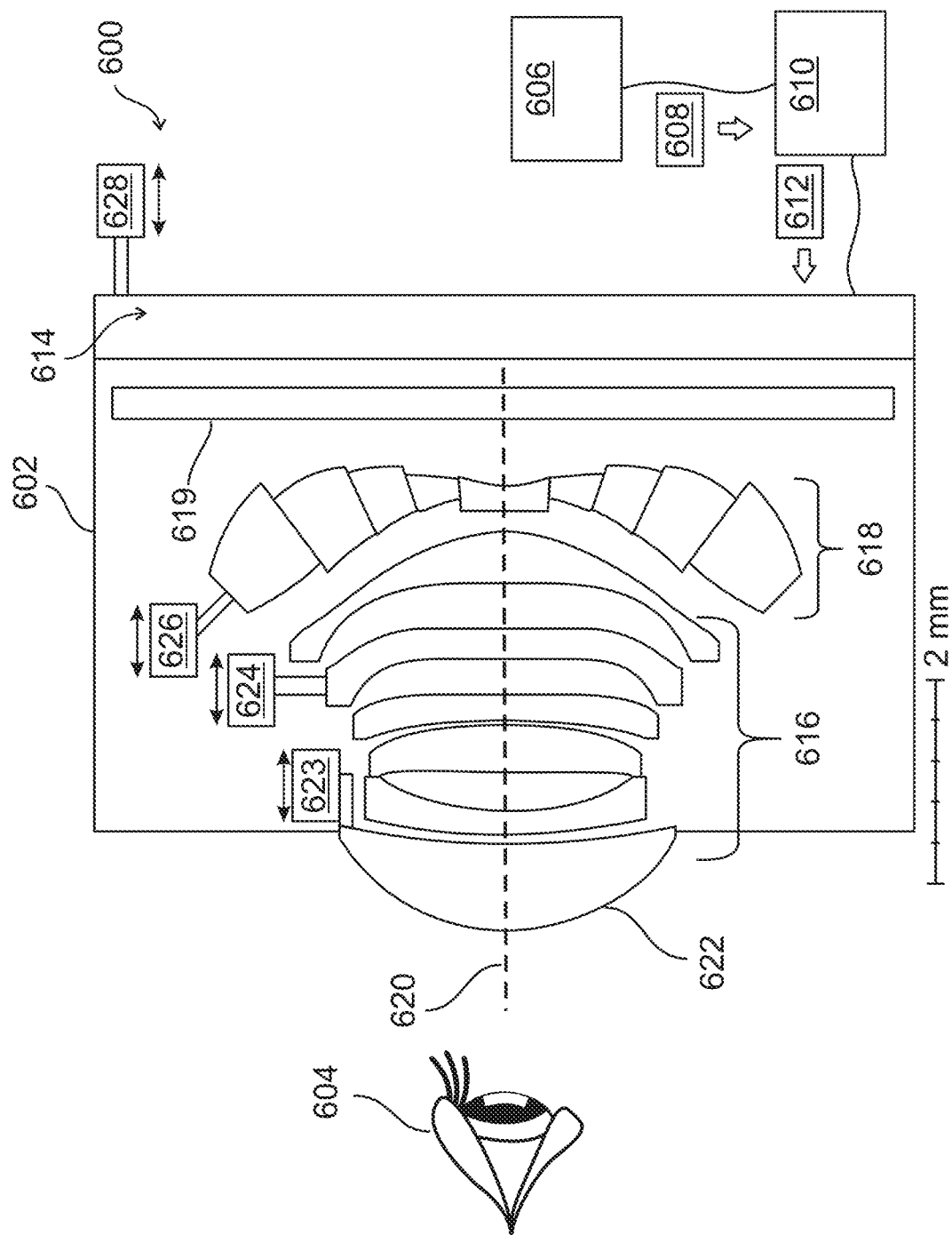
FIG. 6 is a schematic drawing of a projection system for displaying a digital image, according to an exemplary embodiment of the invention.

FIG. 6 shows a projection system 600 that uses a sectioned optical element, according to an exemplary embodiment of the invention. System 600 uses a projection device 602, for example a heads up display device or an augmented reality or virtual reality device, that projects a display of a digital image into the eye of a viewer 604. A data storage device 606, which stores a digital image file 608, sends the digital image file to an image processing module 610. Data storage device 606, and image processing module 610, can be the same physical device, or separate devices with a communications link between them, and one or both of them can comprise, for example, a general purpose computer with a communications link to projection device 602, or a dedicated processor built into projection device 602. Data storage device 606 can be part of, or linked to, a data processor that generates the digital image to be displayed, for example generating images using virtual reality software, or taking digital images that were previously acquired using a still camera or a video camera, or taking digital images from a PowerPoint presentation. Projection system 600 can display still images one at a time, or can display video images by displaying a series of still images in rapid succession, for example under the control of a controller, such as a computer, associated with data storage device 606. Optionally, the controller has a user interface that viewer 604 can use to control which images are displayed.

Image processing module 610 processes digital image file 608 so as to produce a modified digital image file 612, that is distorted in the same way that the field of view would be distorted if projection device 602 were used as a camera. For example, if digital image file 608 showed an image of a Cartesian grid, and if the same arrangement of lens elements were used in projection device 602 as in camera 202, then the image of modified digital image file 612 would resemble uncorrected image 500 in FIG. 5A. Optionally, the image processing module 610 does not take into account the effects of the PSF, when producing modified image file 612, for example if PSF effects are not expected to have a visible effect on the image seen by the viewer. Alternatively, image processing module 610 does take into account the effects of PSF. Image processing module sends modified digital image file 612 to a digital display device 614, which displays the modified image. Display device 614 is any known device used to display digital images, for example, it comprises an array of light emitting elements whose emission of light can be separately controlled, or an array of light reflecting elements whose reflectivity of light can be separately controlled, which can be used to display a digital image that is sent to it, for example with each element of the display corresponding to one pixel of the digital image.

Projection device 602 includes one or more optical elements, for example unsectioned lens elements 616, and a sectioned optical element, for example sectioned lens element 618. Optionally, there is also a flat plate 619 that protects display device 614 or acts as a filter, similar to plate 114 in FIG. 1 or plate 209 in FIG. 2. Optionally, these lens elements are axisymmetric around an axis 620. In the example shown in FIG. 6, lens elements 616 and sectioned lens element 618 are identical to lens elements 206 and sectioned lens element 208 in FIG. 2, in shape and position, and display device 614 is identical in size, resolution and position to sensor 210 in FIG. 2, and plate 619 is identical in thickness and position to plate 209 in FIG. 2. Ignoring point spread effects such as diffraction, and considering only ray optics, the light rays emitted by display device 614 will follow corresponding paths to the light rays striking sensor 210 in FIG. 4, but in the opposite direction. Thus these light rays will exit lens element 622, the front element of lens elements 616, with a distribution of directions that would be expected from a field of view that looks like the undistorted image of digital image file 608. In other words, the lens elements, primarily sectioned lens element 618, will remove the distortions in the displayed image introduced by image processing module 610, and viewer 604 will see an image that looks like the undistorted image of digital image file 608.

Projection system 600, similar to imaging system 200, includes actuators 623 for moving a front lens element 622, actuator 624 for moving one or more of intermediate lens elements 616, or the whole lens, actuator 626 for moving sectioned element 618, and actuator 628 for moving display 614. Moving these elements relative to each other, for example in a direction parallel to optical axis 620, can be used by viewer 604 to adjust the focus of projection system 600, for example to compensate for myopia. The actuators could possibly also be used to zoom in on the image, though that might also require adjusting the image displayed on display 614.

There are some respects in which projection system 600 differs from imaging system 200 in reverse. In imaging system 200, light rays strike each point of sensor 210 over only a limited range of angles, as may be seen from FIG. 4. Display device 614, on the other hand, may emit light rays from each point over a broader range of angles. However, any light rays emitted from display device 614, that are not travelling within the range of angles of the light rays hitting sensor 210 in FIG. 4, will not exit through lens element 622. So those light rays will not be seen by viewer 604.

Another difference between projection system 600, and imaging system 200, is that light rays emerging from front lens element 622 have to enter the pupil of viewer 604 in order to be seen by the viewer. To ensure that this happens, system 600 is optionally designed so that it has an eye box that covers the entire range of positions where the pupil of the viewer might be located. When the viewer looks up or down, or to the side, in order to look at different parts of the image, the viewer's pupil will move up or down or to the side, so the eye box should be wide enough in both the horizontal and vertical directions to accommodate this motion of the pupil. Typically, the width of the eye box is about the width of the exit pupil of system 600. The required width of the exit pupil, to allow the viewer to comfortably look at different parts of the image, depends on the width and height of the field of view, with wider and higher field of view generally requiring a wider exit pupil. It also depends on the extent to which the viewer is expected to move his or her head from side to side or up and down, to compensate for the motion of the pupil. It may also be advantageous to make the exit pupil at least as wide as the pupil of the viewer, to avoid making the viewed image dimmer than necessary, and to avoid loss of resolution due to diffraction effects that may occur if the exit pupil is very narrow. Depending on all of these factors, the exit pupil is, for example, at least 4 mm wide, or at least 6 mm wide, or at least 10 mm wide, or at least 20 mm wide, and the eye box is, for example, at least 10 mm wide, or at least 20 mm wide, or at least 30 mm wide, or at least 40 mm wide, or at least 50 mm wide. Based on the location of the upper and lower marginal light rays for point 424 in FIG. 4, it appears that the exit pupil for system 600 covers almost all of first lens element 622.

Although the viewer may only be looking through a small part of front lens element 622 at any time, and consequently the viewer's pupil only intercepts light rays coming from a part of lens elements 616 at a given time, lens elements 616 are optionally not sectioned, so it does not matter which parts of them the viewer is looking through. On the other hand, all light rays coming from a given region of display 614 will reach front lens element 622 only through one section of sectioned lens element 618, so the viewer will see the same undistorted image regardless of the location of the viewer's pupil, as long as the pupil is located within the eye box of system 600.

Unlike the paths of the light rays in the limit of geometric optics, light rays going from the display to the viewer's eye in FIG. 6 will not reverse the point spread of the light rays going from the field of view to the sensor in FIG. 2. Instead, light rays going from the display to the viewer's eye will undergo their own point spread effects. But it is likely that the aperture of the viewer's pupil will be the narrowest aperture on the optical path, and the retina of the eye is designed to have a resolution that is too low to be affected by diffraction effects of the pupil, so point spread effects in projection system 600 may not be as important as they could be in imaging system 200, and optionally they are ignored.

In projection system 600, the image viewed by the viewer is optionally a virtual image. In some embodiments of the invention, the projection system projects a real image, for example focused on a ground glass screen to the left of the lens elements in FIG. 6, and the viewer views the real image, optionally through additional optical elements. Alternatively, if display 614 is bright enough, the real image is projected on a screen some distance away, optionally through additional optical elements, where it can be viewed, for example, by several people sitting in a room. The location where the projected image is in focus, real or virtual, can be changed by changing the position of one or more of the lens elements axially, similarly to the way the focus is changed in imaging system 200, and/or by adding additional lens elements in front of lens element 622.

Although in general point spread effects are expected to be less important for projection system 600 than for imaging system 200, whether the projection system is used as a heads up display or for projecting an image onto a distant screen, projection system 600 optionally has an effective aperture, for example front lens element 622, or an effective aperture that is further back, for which the transmission coefficient in some parts of the effective aperture is greater than 0% and less than its maximum value, for example greater than 10% of its maximum value and less than 90% of its maximum value, for light emitted by at least one portion of the display screen. Optionally, at least 20% of the area of the aperture with transmission coefficient more than 10% of its maximum value has transmission coefficient less than 90% of its maximum value, for at least some wavelengths of visible light emitted by that portion of the display screen. Optionally, the effective aperture is at least approximately a Gaussian aperture. Such an effective aperture may help to reduce any remaining point spread effects in the projected image.

Figure 7:
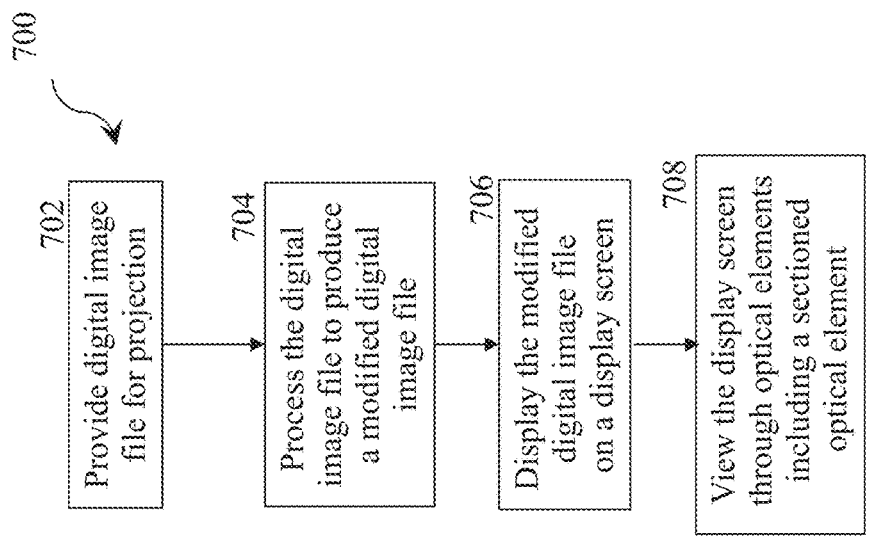
FIG. 7 is a flowchart for an image processing method used in the projection system of FIG. 6.

FIG. 7 shows a flowchart 700, for a method of projecting an image using projection system 600. At 702, an original digital image file, such as image file 608 in FIG. 6, is provided. At 704, the digital image file is processed, for example by image processing module 610, to produce a modified digital image file, such as image file 612 in FIG. 6. In the modified image, the original image is mapped to multiple non-overlapping regions, each region mapping a different region of the original image, with the regions of the original image optionally overlapping, so that some points on the original image are mapped to two points, or even more than two points, in the modified image. There may be gaps between the different regions of the modified image, to which no point on the original image is mapped. Typically, considering only geometric optics, and ignoring diffraction effects, the modified image will resemble what the original image would look like if it were imaged by a camera, such as camera 202 in FIG. 4, that has the same configuration of optical elements as projection device 602 in FIG. 6, including a sectioned optical element such as sectioned lens element 618. For example, for an original image that looks like a rectangular grid, the modified image, for projection system 600, would look like image 500 in FIG. 5A.

At 706, the modified digital image is displayed on a display screen. At 708, the display screen is viewed by a viewer, through a set of optical elements, such as elements 616 and 618 of FIG. 6. The viewer will see an image that resembles the original digital image, for example with much less distortion than the modified digital image, because the optical elements, including the sectioned optical elements, will distort the image on the display screen in a way that largely corrects the distortion introduced into the modified image. This occurs because the light rays going from display screen 614, through lens elements 616 and 618, to the eye of viewer 604, follow the same paths as the corresponding light rays going from field of view 204, through lens elements 206 and 208, to sensor surface 210 in FIGS. 2 and 4, assuming that the lens elements 206 and 208, and sensor surface 210, in FIGS. 2 and 4, have the same configuration as lens elements 616 and 618, and display 614, in FIG. 6.

Design of Imaging or Projection Systems with Improved Performance

Figure 8:
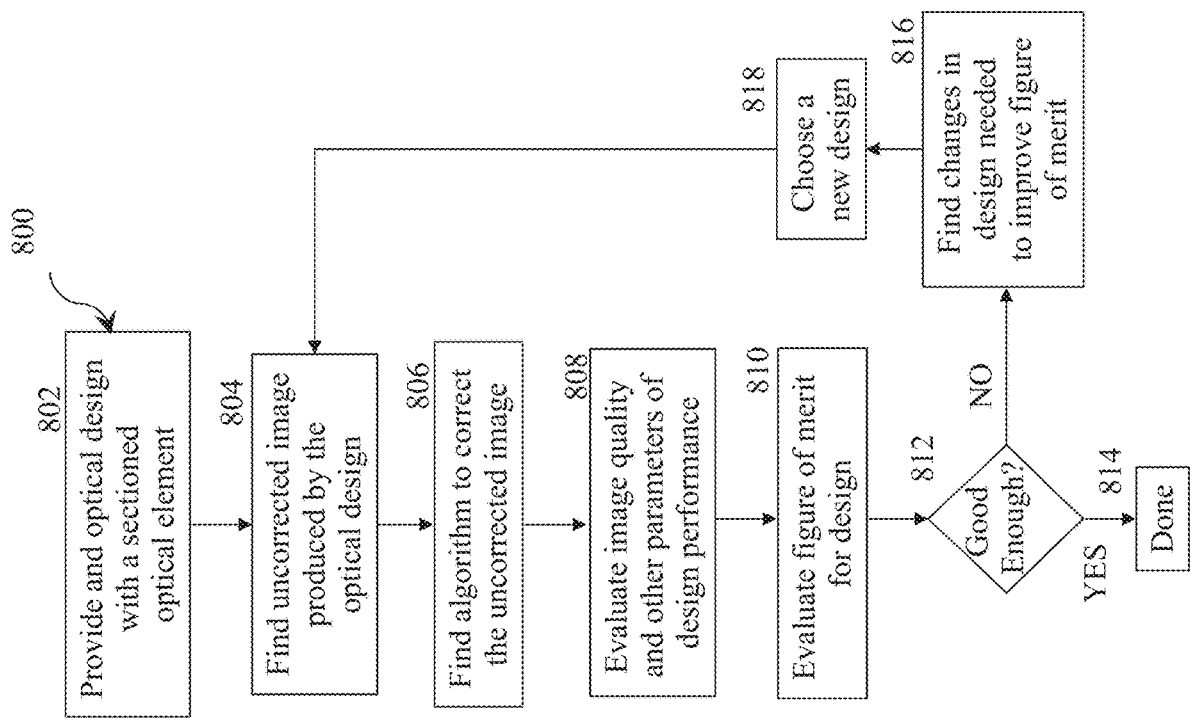
FIG. 8 is a flowchart for a method for designing an imaging system such as the system shown in FIG. 2, or a projection system such as the system shown in FIG. 6.

FIG. 8 shows a flowchart 800 for a method of designing an optical system, either an imaging system such as the one shown in FIG. 2, or a projection system such as the one shown in FIG. 6, with optimized or at least improved performance parameters, according to an exemplary embodiment of the invention. Optionally, the optical system is constrained to have a sectioned optical element, such as lens element 208 in FIG. 2, or lens element 618 in FIG. 6. Improved performance parameters can include, for example, one or more of improved image quality including higher resolution, lower distortion and lower noise level, lower numerical aperture, larger field of view, greater real zoom ratio in the case of a zoom lens, reduced sensitivity of image quality to fabrication errors in position, orientation and shape of the optical elements, improved robustness to vibrations and shock, lower manufacturing costs, smaller dimensions and smaller weight. Optionally, a figure of merit for performance is defined, based on any of these or other factors. If there is a minimum value of some quantity that the design is required to satisfy, then the figure of merit may be set to zero for designs that do not satisfy that requirement. A design is then found, using the method of flowchart 800, that maximizes the figure of merit, or at least improves the figure of merit.

At 802, an initial design for the optical system is provided. The optical design comprises a set of parameters defining the optical surfaces of each element of the optical system, and each section of any sectioned elements, as well as the index of refraction of each element. The set of parameters needed to define the surfaces depends on the type of surface chosen, and this constrains the design. For example, optical elements are constrained to be axisymmetric around an optical axis, including a sectioned element with a circular central section and four concentric annular sections surrounding the central section. The front and back surface of each element is, for example, an even aspherical surface, and is defined by parameters that include the outer radius, the inner radius in the case of an annular section, the axial position and the curvature on the axis (or if the surface were extended to the axis, in the case of an annular section), the conic constant, and one or more parameters defining the aspherical departure of the surface from a conic surface, in the axial direction. For example, the aspherical parameters are coefficients of a polynomial function of the radius squared, for example an $8^{th}$ degree polynomial. The degree of the polynomial is great enough, for example, to allow the surfaces of the elements to vary significantly in sign and degree of curvature and in orientation, as a function of radius, similar to the shapes of the lens elements shown in FIG. 1 and FIG. 2. The surface sag, the axial coordinate z of the surface as a function of radius r, for an even aspherical surface is given by $$z = \frac{cr^2}{1 + \sqrt{1 - (1+k)c^2 r^2}} + \sum_{i=1}^{n} \alpha_i r^{2i}$$

where c is the curvature, k is the conic constant, the $\alpha_i$'s are the aspheric parameters, the coefficients of the polynomial function of $r^2$, and n is the degree of the polynomial. The *Zemax® User Manual* cited above gives examples of many other types of optical surfaces and the parameters that define them, including a biconic asphere, a conic or biconic asphere with Zernike polynomial terms added, diffractive surfaces of various kinds, rotationally symmetric cubic spline fits to a plurality of points, for example 8 points or 250 points, a polynomial cylindrical surface, a Fresnel or generalized Fresnel surface, an odd asphere, an odd asphere with cosine polynomial terms, a surface shape defined by a grid of points, surfaces with decenter, tilt, and other deformations, a periodic surface, a polynomial surface, a Q-type asphere using Forbes polynomials, a radial non-uniform rational basis spline (NURBS) surface, a superconic asphere, a toroidal surface, and a toroidally symmetric NURBS surface.

At 804, the uncorrected image is calculated that would be produced by the initial optical design, for a standardized field of view, for example a Cartesian grid or some other kind of test pattern at infinity, or at a finite distance that the lens elements are focused on. In the case of an imaging system such as system 200 in FIG. 2, this means the image of the standardized field of view projected onto sensor surface 210 by lens elements 206 and 208. In the case of a projection system such as system 600 in FIG. 6, this means the image of the standardized field of view that would be projected onto a surface located at the surface of display 614, by lens elements 616 and 618, if the standardized field of view were located at infinity, or at a distance that lens elements 616 and 618 are focused on, to the left of front lens element 622. The uncorrected image calculated at 804 includes the effects of distortion produced by the lens elements, including the sectioned lens element, and optionally also the effects of PSF, from aberration and diffraction, at least in the case of an imaging system. But optionally, in the case of a projection system, the effects of PSF on the image that would be projected onto a surface located at the surface of display 614, by lens elements 616 and 618, are ignored in calculating the uncorrected image.

At 806, an algorithm is found to correct the uncorrected image found at 804. This algorithm corrects the distortion produced by the lens elements, in particular including the distortion produced by the sectioned lens element, smoothly joining together the non-overlapping regions of the image projected by each section of the sectioned lens element. The algorithm also optionally includes deconvolution of the expected PSF from the uncorrected image, at least if the effects of PSF were included in calculating the uncorrected image at 804.

At 808, the image quality produced by the optical design is evaluated, as well as other parameters of the optical design that will contribute to a figure of merit for the design, including any of the performance parameters mentioned above. In the case of an imaging system, the image quality refers to the corrected image, after applying the correction algorithm found at 806 to the uncorrected image projected to the sensor surface. In the case of a projection system, the image quality refers to the image expected to be seen by the viewer through lens elements 616 and 618, when the uncorrected image is displayed on display 614. The image quality, for example, may include the resolution of the corrected image, due to diffraction and aberration effects which are not corrected by deconvolution, as well as due to the size of the light sensing elements in sensor 212 or the pixels in display 614. It also may include an expected noise level in the corrected image, defined for example for an expected light level, pixel size, and exposure time. It also may include an expected residual uncorrected distortion in the image, due to an expected level of error in the positions and shapes of the optical elements. Additionally or alternatively, a desired maximum level of manufacturing tolerances are found, for the positions and shapes of the optical elements, that will produce a given level of distortion in the corrected image, and/or a given reduced level of resolution in the corrected image, for example a level of distortion, and/or a loss of resolution, that will just be visible given the resolution and noise level of the image when the optical elements are shaped and positioned perfectly. The desired maximum level of manufacturing tolerances are calculated, for example, by calculating the degree of distortion and/or loss of resolution due to errors in shape and positioning of the optical elements and the sensor or display. Robustness to vibrations and/or shock, also possible parameters of the design that contribute to the figure of merit, are optionally found, for example, by calculating how much the image quality is degraded when the relative positions and orientations of the different optical elements and the sensor or the display are displaced by a given level of vibration or shock, and finding the level of vibration or shock at which the image quality is significantly degraded compared to what it would be in the absence of any vibration or shock. Other performance parameters of the optical system that may contribute to the figure of merit, as mentioned above, may include any of numerical aperture; size of the field of view; zoom ratio in the case of a zoom lens; manufacturing costs which may depend on the desired level of tolerances and robustness, as well as on the size and number of pixels of the sensor or display; dimensions; and weight.

At 810, the figure of merit for the optical design in evaluated, using a combination of any of the quantities found at 808.

At 812, a decision is made as to whether the figure of merit for the present optical design is good enough. This may depend, for example, on whether the figure of merit is above some threshold value, and/or on whether it has continued to improve enough over previous iterations of the design, and/or on how many iterations of the design have been performed. If the figure of merit is good enough, then the design is done, at 814. If not, then at 816 a calculation is made of changes in the design that would increase the figure of merit. For example, small changes can be made in different design parameters, such as the shape and positions of the optical elements, and the resulting small changes in the figure of merit calculated. All the design parameters need not be varied, but some may be held fixed, for example the index of refraction of the optical elements may be constrained by a decision in advance to use a particular lens material. Then any known optimization algorithm, for example a linear or quadratic optimization algorithm, can be used to try to increase the figure of merit. It should be noted that this optimization or improvement process is potentially greatly simplified, compared to the situation for a conventional optical design, because the image quality in a given region of the uncorrected image, and hence also in the corresponding part of the corrected image, depends on the shape of only one section of the sectioned lens element, and not on the shapes of the other sections.

At 818, using the optimization algorithm and the calculations made at 816, a new design is chosen, for which the figure of merit is expected to be higher than for the previous design. The uncorrected image produced by the new design in then found at 804, and the procedure continues as with the initial design, iterating until a design is found that is considered at 812 to be good enough.

If the optical design is constrained to be axisymmetric around an optical axis, then the design parameters that can be used to optimize or improve the optical design include, for each lens element or section:
Radius of front surface;
Radius of back surface;
Conic constant of front surface;
Conic constant of back surface;
Thickness;
Distance from next element in front of it;
Distance from next element behind it (or distance to the sensor if it is the last element);
Curvature of front surface;
Curvature of back surface;
Any higher moments of front and back surface shape, such as the aspherical polynomial coefficients described above;
Material (including index of refraction as a function of wavelength).

The front surface of an element or section, as used herein, means the entire surface that of that element or section that receives light from the field of view, and the back surface of an element or section, as used herein, means the entire surface of that element or section that transmits light toward the sensor array. In the case of all lens elements and sections, these parameters are constrained not to have values that will make different elements intersect each other. In the case of sections of a sectioned element, if it is manufactured using injection into a rigid mold, then the parameters are optionally constrained to have values that will make the different sections not overhang each other, which would prevent the sectioned element from being removed from the mold. This may mean that the radial ranges of the front surfaces for any two sections should not overlap, and the radial ranges of the back surfaces for any two sections should not overlap. The inventors have found that injection of a plastic under pressure into a rigid mold is the most economical and accurate way to manufacture the sectioned lens element.

The size of the sensor array, and the spacing of its elements, are also design parameters that need to be taken into account in optimizing the other parameters, though they may be fixed in advance by a decision to use a particular sensor array that is available.

For purposes of calculating the sensitivity of a design to manufacturing errors, and the desired maximum manufacturing tolerances that would result in a desired image quality, it is also necessary to calculate the performance of a design in the presence of small perturbations away from axisymmetry. The most important of these perturbations are likely to be decenter and tilt for each element and each section of the sectioned element. Perturbations of the design parameters listed above, which preserve axisymmetry, may also be used in calculating the sensitivity of a design to manufacturing errors, and the desired maximum manufacturing tolerances.

It is expected that during the life of a patent maturing from this application many relevant optical elements, imaging sensors, and imaging displays will be developed and the scope of the terms optical element, sensor, and display are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

EXAMPLES

Reference is now made to the following examples, which together with the above descriptions illustrate some embodiments of the invention in a non limiting fashion.

An analysis was made of the sensitivity of image quality to manufacturing errors, for two designs for cell phone cameras. The first design is a conventional design, similar to that shown in FIG. 1, and the second design has a sectioned lens element, according to an exemplary embodiment of the invention, similar to the design show in FIG. 2, with a central circular section surrounded by four concentric annular sections. Both designs have a total track length (TTL) from the aperture to the sensor of 5.7 mm, both have an f/1.4 aperture, both have a field of view that is 80 degrees wide, both have an image height of 7.8 mm, and both have a sensor array with sensor elements (pixels) spaced at a distance of 1.55 µm. A calculation was made of the degradation of image quality that would result from manufacturing errors in various parameters of the lens elements, assuming a normal distribution of errors of with a two standard deviation value that represents a typical level of manufacturing tolerances that can be readily achieved for such cell phone cameras. It was found that, for the design using the sectioned element, this distribution of manufacturing errors would result in an 80% yield of cameras that satisfy the requirement that the modulation transfer function (MTF) has a weighted average that is at least 50% at a resolution of 80 cycles per mm, throughout the central 80% (the central 64 degrees) of the field of view, and at least 70% at the center of the field of view, the weighted average being over five different wavelengths, 470 nm with a weighting of 0.1, 510 nm with a weighting of 0.5, 555 nm with a weighting of 1.0, 610 nm with a weighting of 0.5, and 670 nm with a weighting of 0.1. But for the design that did not use a sectioned element, the same distribution of manufacturing errors resulted in only a 20% yield.

The parameters of the lens elements and sections that were assumed to have manufacturing errors were: 1) Decenter, both x and y components, measured in µm; 2) Tilt, both x and y components, measured in degrees; 3) Thickness, measured in µm; 4) Surface shape power, which is the radius of curvature for the front surface and the back surface, both measured in µm, with the surface power shape treated as independent parameters for the front and the back surface; and 5) Irregularity of the surface, independently for the front surface and back surface, measured in number of fringes in the interference pattern used to test it, where one fringe indicates a deviation in the shape of the surface equal to half a wavelength, where the wavelength was 632.8 nm. The irregularity of the surface was assumed to be due half to spherical aberration, a distortion of the surface with $\Delta z$ proportional to $r^4$, and half to astigmatism, a distortion of the surface with $\Delta z$ proportional to $(y \cos \theta - x \sin \theta)^2$, with the axis of astigmatism oriented at a random angle $\theta$ to the y axis.

In calculating the yield, it was assumed that each of the parameters varied independently, for each element, and for each section of the sectioned element. However, the yield would not be significantly different if a given type of parameter (for example decenter, or tilt, or thickness) did not vary independently for the different sections of the sectioned element, since the image quality at a given point in the uncorrected image depends only on manufacturing errors in the parameters of one section, and the image quality at each point in the corrected image depends mostly on the image quality of the corresponding point or points in the uncorrected image. Both designs were optimized to maximize their manufacturing yield in the presence of these manufacturing errors in these parameters, subject to the constraints on TTL, f number, field of view, image height, and pixel spacing.

The two standard deviation magnitude of the manufacturing errors that were assumed are shown in Table 1. The x and y components of decenter, and the x and y components of tilt, were allowed to vary independently.

TABLE 1

| Magnitude of manufacturing errors assumed | |
|---|---|
| Parameter | Two standard deviation magnitude of manufacturing errors |
| Decenter (µm), both x and y | ±2 |
| Tilt (degrees), both x and y | ±0.066 |
| Thickness (µm) | ±2 |
| Optical power (µm) | ±2.0 |
| Surface irregularity (Fringe) | ±1 |

As noted above, with the manufacturing errors shown in Table 1, the manufacturing yield was 80% for the optimized sectioned design, but only 20% for the optimized non-sectioned design. A calculation was also made of the manufacturing yield for the optimized non-sectioned design, if its manufacturing errors were assumed to be only half as great in magnitude as the values shown in Table 1. The yield in this case was found to be 80% for the non-sectioned design. However, manufacturing a cell phone camera with such tight tolerances, if it could be done at all, would be much more difficult and expensive than manufacturing it with the tolerances shown in Table 1, and it may be impossible. So the use of a design with a sectioned lens element either greatly increases the yield, for the same cost of manufacturing, or greatly decreases the cost of manufacturing, for the same yield.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An optical system that produces a digital image of objects in a field of view, comprising:
   a) a sensor array of light sensors that produces an output signal indicating an intensity of light received by each light sensor; and
   b) one or more optical elements that together project an image of a plurality of in-focus portions of the field of view onto the sensor array, including at least one sectioned optical element comprising a plurality of sections, at least two of the sections differing in one or both of size and shape, each section projecting onto the sensor array an image of only one of the in-focus portions of the field of view, the different sections projecting images of different ones of the in-focus portions of the field of view to non-overlapping regions of the sensor array, wherein each in-focus portion of the field of view partially overlaps at least one of the other in-focus portions, an object located in an overlap of two in-focus portions having its image appear twice on the sensor array.

2. An optical system according to claim 1, wherein the sensor array is substantially planar.

3. An optical system according to claim 2, wherein the optical elements comprise a front lens element, wherein the field of view includes an imaging plane, parallel to the plane of the sensor array, and wherein at least a part of any images projected from the imaging plane to the sensor array, corresponding to directions in the field of view less than 30 degrees from a central direction of the field of view, where directions in the field of view are defined from the front lens element, have a degree of distortion with respect to the imaging plane greater than 10%.

4. An optical system according to claim 3, wherein the optical elements together are substantially cylindrically symmetric around an optical axis that is oriented along the central direction of the field of view.

5. An optical system according to claim 1, wherein most of the area of the sensor array receives light from parts of the field of view that belong to only one of the portions of the field of view.

6. An optical system according to claim 1, comprising a computer or digital processor that receives the output signals of the sensor array, and that is configured to use the output signals to find digital images of the different portions of the field of view, and to use an image processing algorithm to combine the digital images of the different portions of the field of view into the digital image of the field of view.

7. An optical system according to claim 6, wherein each portion of the field of view partially overlaps at least one of the other portions, and the image processing algorithm uses the overlapping parts of the portions to combine the digital images.

8. An optical system according to claim 7, wherein the image processing algorithm is configured to combine the digital images of the different portions of the field of view so that overlapping parts of the portions appear only once in the digital image of the field of view.

9. An optical system according to claim 6, wherein the image processing algorithm reduces or eliminates discontinuities in the digital image of the field of view between locations corresponding to different portions of the field of view.

10. An optical system according to claim 6, wherein the image processing algorithm deconvolves an expected point spread function (PSF) from at least a portion of the digital images of the different portions of the field of view, before combining them, after combining them, or both.

11. An optical system according to claim 1, wherein an expected PSF for at least one portion of the images projected onto the sensor array has at least 95% of its integral within a central region with no zeroes, for at least some wavelengths of light between 400 and 1100 nm.

12. An optical system according to claim 1, wherein, for at least one portion of the images projected onto the sensor array, an expected PSF is based at least on diffraction from an effective aperture, and the effective aperture includes a region with transmission greater than 10% of a maximum transmission in the effective aperture and less than 90% of the maximum transmission, wherein at least 20% of the area of the aperture with more than 10% of the maximum transmission has less than 90% of the maximum transmission, for at least some wavelengths of light between 400 and 1100 nm.

13. An optical system according to claim 1, wherein the images of the different portions of the field of view have gaps between them that are not part of the digital image of any of the portions of the field of view.

14. An optical system according to claim 1, wherein the at least one sectioned optical element has a surface with an orientation that is discontinuous at boundaries between the sections.

15. An optical system according to claim 14, wherein the at least one sectioned optical element has one or more steps between the sections, and the orientation of a surface of that optical element in two adjacent sections on opposite sides of a step is discontinuous between the opposite sides of the step.

16. An optical system according to claim 1, wherein the at least one sectioned optical element has an optical power that changes discontinuously at least one boundary between two of the sections, for light rays reaching the two sections travelling in a same direction.

17. An optical system according to claim 1, wherein the at least one sectioned optical element comprises gaps between at least some of the sections.

18. An optical system according to claim 17, wherein each gap has a width less than 20% of a width, in a direction across the gap, of each of the sections that the gap is between.

19. An optical system according to claim 1, wherein a greatest distance from the sensor array to any part of the one or more optical elements, is less than a greatest distance between any two parts of the sensor array on which parts of the image of the field of view is projected.

20. An optical system according to claim 1, comprising a mechanism for reversibly folding or collapsing the one or more optical elements relative to each other, relative to the sensor array, or both, to make the optical system more compact when it is not in use.

21. An optical system according to claim 1, wherein the optical elements comprise a front lens element, and wherein, for each direction in any one of said in-focus portions of the field of view, there is a direction no more than 10 degrees from that direction, that is part of another one of said in-focus portions of the field of view, directions in the field of view being defined from the front lens element.

22. An optical system according to claim 1, wherein the optical elements comprise a front lens element, and wherein, considering each direction in the field of view, from the front lens element, as corresponding to a point on the surface of a sphere, no two of the in-focus portions of the field of view have a same shape and size in range of directions from the front lens element.

23. An optical system according to claim 1, wherein the optical elements comprise a front lens element, and wherein, considering each direction in the field of view, from the front lens element, as corresponding to a point on a surface of a sphere, at least two of the in-focus portions of the field of view have a range of directions, from the front lens element, corresponding to substantially concentric annuluses on the surface of the sphere.

24. An optical system according to claim 1, wherein the sections of the sectioned optical element that project light from at least two portions of the field of view are substantially annular in shape, and substantially axisymmetric about a same optical axis.

25. An optical system according to claim 24, wherein the two sections have front surfaces oriented on average inward toward the optical axis and back surfaces oriented on average outward away from the optical axis, with the front and back surface of a first one of the sections, that is located closer to the optical axis, oriented on average with a normal direction at a shallower angle to the optical axis than the front and back surfaces of a second one of the sections, that is located further from the optical axis.

26. An optical system according to claim 24, wherein a first one of the sections, located closer to the optical axis, has an optical power, on average for light rays that it projects from the field of view to the sensor array, that is less positive than an average optical power of a second one of the sections, located further from the optical axis, for light rays that it projects from the field of view to the sensor array.

27. An optical system according to claim 24, wherein the two sections comprise an inner section and an outer section, each with a front surface through which they receive light from the field of view, the front section of the inner section being entirely closer to the optical axis than any of the front surface of the outer section, wherein the front surface of the inner section has a greater radial extent than the front surface of the outer section.

28. An optical system according to claim 24, wherein the two sections comprise an inner section and an outer section, each with a back surface through which they transmit light to the sensor array, the back section of the inner section being entirely closer to the optical axis than any of the back surface of the outer section, wherein the back surface of the inner section has a greater radial extent than the back surface of the outer section.

29. An optical system according to claim 24, wherein one or more of the substantially annular sections furthest from the optical axis project light rays from directions in the field of view that are furthest from the optical axis direction, and the light rays coming from one of the directions that are projected by one of those annular sections are approximately parallel when they reach that section, and that section has a positive focal length that makes those light rays converge when they reach the sensor array.

30. An optical system according to claim 24, wherein at least two of said portions of the field of view are adjacent to each other, the two annular sections that respectively project light from them are adjacent to each other, and light rays that come from neighboring directions in different ones of those two portions are approximately parallel to each other when they respectively enter different ones of those two sections, and are approximately parallel to a boundary between those two sections.

31. An optical system according to claim 1, wherein the sections of the sectioned optical element comprise a plurality of lenslets arranged in concentric circles.

32. An optical system according to claim 1, comprising a front aperture that limits the light from the field of view that passes through and beyond a first optical element that light rays pass coming from the field of view, wherein at least 70% of the light that passes through the front aperture contributes to the image of the field of view on the sensor array.

33. An optical system according to claim 32, wherein the area of the front aperture is connected.

34. An optical system according to claim 32, wherein a boundary of the front aperture is in one plane, and the front aperture is its own convex hull in that plane.

35. An optical system according to claim 1, having an optical axis, having a total track length along the optical axis from a furthest front surface of the optical elements to the sensor array that is less than 7 mm, and having a field of view that extends at least 30 degrees in all directions around a central direction, wherein, if the optical system were manufactured with each optical element and each section of the one or more sectioned optical elements independently having a random error in position with a normal distribution with a two standard deviation value of 2μm and no other manufacturing errors, then the manufacturing yield would be at least 50% for systems that satisfy a condition that a modulation transfer function is at least 50%, for at least resolution that is at least 80 cycles/mm, for 555 nm light, for all locations on the image that correspond to directions in the field of view within 30 degrees of the central direction, and is at least 70% for a location in the image that corresponds to the central direction in the field of view.

36. An optical system that produces a digital image of a field of view, comprising:

a) a sensor array of light sensors that produces an output signal indicating an intensity of light received by each light sensor; and b) one or more optical elements that together project an image of the field of view onto the sensor array, including at least one sectioned optical element comprising a plurality of sections, at least two of the sections differing in one or both of size and shape, each section projecting onto the sensor array an image of only a portion of the field of view, the different sections projecting images of different portions of the field of view to non-overlapping regions of the sensor array, wherein the at least one sectioned optical element has one or more steps between the sections, and an orientation of a surface of that optical element in two adjacent sections on opposite sides of a step is discontinuous between the opposite sides of the step.

* * * * *